United States Patent [19]

Redford et al.

[11] Patent Number: 4,692,858
[45] Date of Patent: Sep. 8, 1987

[54] VISUAL INTERFACE BETWEEN USER AND COMPUTER SYSTEM

[75] Inventors: Peter M. Redford; Rita A. Redford, both of Los Gatos, Calif.

[73] Assignee: Trillian Computer Corporation, Los Gatos, Calif.

[21] Appl. No.: 576,535

[22] Filed: Feb. 2, 1984

[51] Int. Cl.⁴ .............................................. G06F 3/00
[52] U.S. Cl. ................................................. 364/200
[58] Field of Search ................................ 364/200, 900

[56] References Cited

U.S. PATENT DOCUMENTS

| | | | |
|---|---|---|---|
| 4,193,119 | 3/1980 | Arase et al. | 364/900 |
| 4,428,065 | 1/1984 | Duvall et al. | 364/900 |
| 4,555,775 | 11/1985 | Pike | 364/900 |

OTHER PUBLICATIONS

Mouse Systems—PC Mouse Pop Up Menu Software, Aug. 23, 1983, pp. 1, 33, 38/39, 68, 69.
Designing the Star User Interface by D. C. Smith, et al., Apr. 1982.
PC: BlueBook—PC Mouse, PC Magazine 733, Dec. 1983.
Hardware—Review: PC-Mouse by J. Markoff, vol. 5, No. 44 InfoWorld.
Introducing the Smalltalk-80 System by A. Goldberg, Aug. 1981.
Product Description, The Lisa Computer System—Apple Designs a New Kind of Machine, by G. Williams, Feb. 1983.
Maynard Electronics—Sandstar ™ Memory Card.
The Architecture of the Lisa ™ Personal Computer by B. Daniels.
Proceedings of the IEEE, vol. 72, No. 3, Mar. 1984.

*Primary Examiner*—Gareth D. Shaw
*Assistant Examiner*—Kevin A. Kriess
*Attorney, Agent, or Firm*—Cushman, Darby & Cushman

[57] ABSTRACT

The present invention provides an interface between the user and a computer system. Specifically, the user may predefine various tasks, indicia of which are displayed on a display screen associated with the computer system. A respective task may be effected by designating the indicia of the task on the display screen with an indicator (such as a cursor) and depressing a single button. The position of the indicator on the display screen may be specified by the moving of a mouse pointing device. A user may predefine the various tasks by generating a source code data file, which is compiled to produce a structured database stored in a random access memory. Tasks to be performed may include changing the function associated with actuating the mouse pointing device. Associated with the structured database are a number of nominal blocks including blocks defining groups of indicia to be displayed on the display simultaneously, and tasks associated with each of the indicia to be effected. When a given task indicia is selected from the display screen, input signals corresponding to the task definition code string associated with that selected indicia is generated as an input signal to the computer system. Indicia of tasks may be displayed on the display screen in an overlay display window having an appropriate geometry and format corresponding to the number of indicia to be displayed.

12 Claims, 18 Drawing Figures

| | |
|---|---|
| USER RESPONSE BUFFER | 36 |
| TEMPORARY KEYBOARD BUFFER | 38 |
| CURRENT WINDOW NUMBER RECORD | 40 |
| DELIMITER COUNTER | 42 |
| SAVE TEXT BUFFER | 44 |
| CURRENT CURSOR POSITION RECORD | 45 |
| TASK DEFINITION RECORD, ADDRESS, POINTER | 77 |
| USER COMMAND BUFFER | 47 |
| COMMAND RECORD POINTER | 46 |
| PROMPT FLAG | 70 |
| KEYBOARD INTERRUPT FLAG | 72 |
| WINDOW DISPLAY FLAG | 74 |
| MOUSE FUNCTION RECORD ADDRESS POINTER | 76 |
| CHANGE BUTTON FLAG | 78 |
| BUTTON RESERVE FUNCTION STRING RECORDS (4) | 80 |
| BUTTON COMMAND BUFFER | 82 |

*Fig. 3(E)*

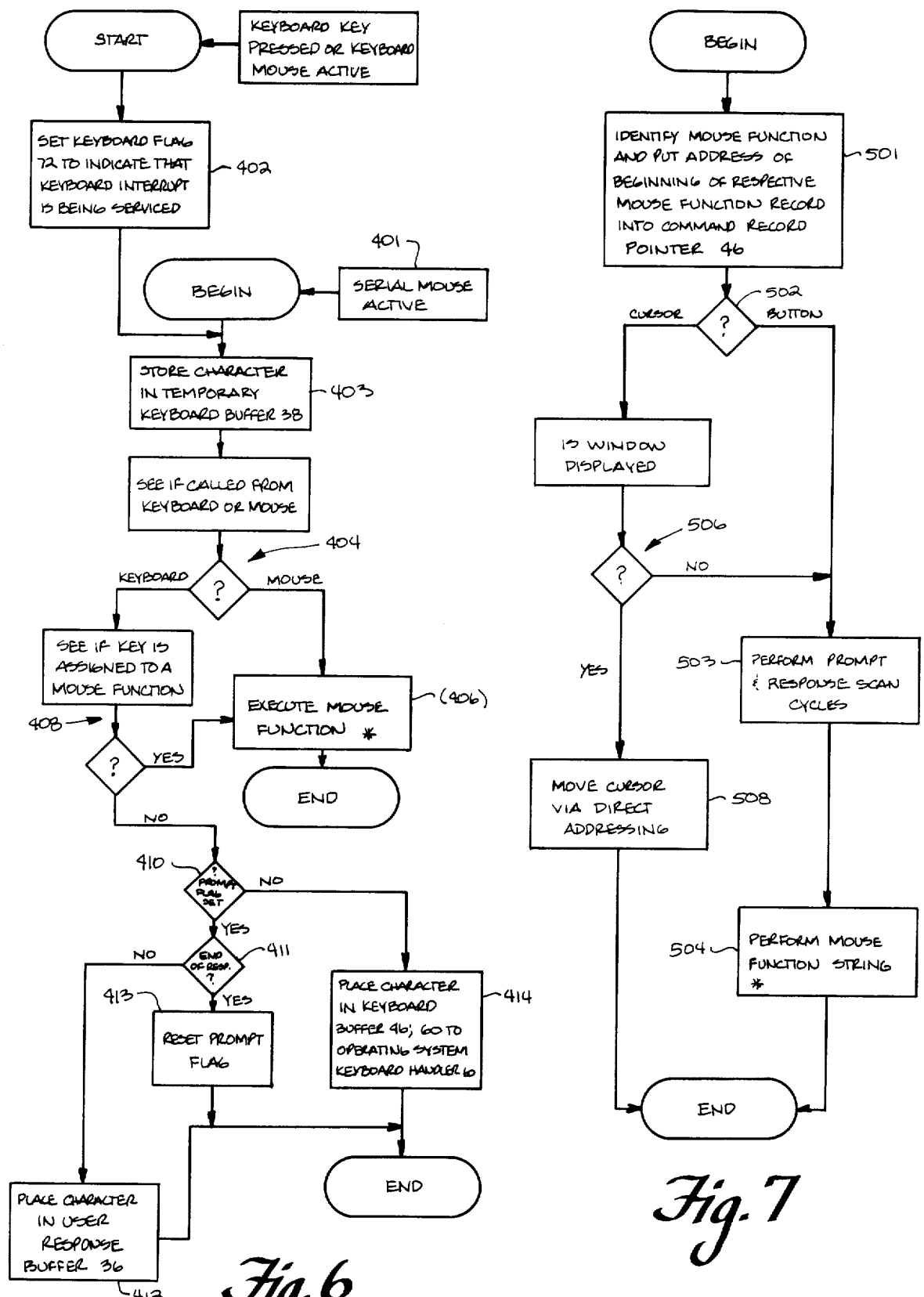

4,692,858

VISUAL INTERFACE BETWEEN USER AND COMPUTER SYSTEM

The present invention relates to a program for facilitating operation by a user of a computer system (hardware, operating system and application software), and, in particular, for providing a visual interface between the user and the computer system.

BACKGROUND OF THE INVENTION

As the use of computer systems becomes more widespread, the need for facilitating operation and control of the computer system has become acute. It has become increasingly desirable to permit relatively inexperienced users with little or no training to use a computer system. In this regard, so-called "menu driven" programs, wherein the various operational choices made availabe by the program are displayed for the user, are well known. In the typical menu-driven system, the user enters through the keyboard one or more symbols representative of the particular operational choice to be effected.

Various other systems, such as the Apple LISA system, permit choice of the operational system by positioning an indicator (e.g., cursor) on the display in predetermined relative positions with indicia of the alternative operational choices, to designate the particular choice in lieu of entering the choice through the keyboard.

However, in each instance, the menu mechanism is built into the particular "application" software (i.e. software executed by the system for accomplishing a predetermined task or tasks, such as, for example, text editing, data file manipulation, etc.), and is not generally applicable. Moreover, since the source codes to many programs are not available, it is improbable that the typical user can alter the program to accommodate additional operational branches or to alter the existing menu. There is therefore a need for an interface environment of general applicability which permits the user to designate various alternative commands for applications programs without requiring alteration of the operating or applications programs themselves.

The use of a "mouse" pointing device to facilitate movement of a cursor is, in general, known. A "mouse" typically includes an element for sensing movement of the mouse (up, down, right, left) on a flat surface, and one or more conventional buttons or switches. Signals generated by the movement of the sensing elements may control cursor movement in accordance with physical movement of the mouse on the flat surface. Predetermined commands may be executed by depressing one of the mouse buttons. The functions (commands) assigned to a particular mouse button typically are established and fixed by the program being run on the computer. However, it is sometimes desirable to vary the mouse button function from a fixed predetermined function in accordance with the particular needs of the user and to increase versatility.

SUMMARY OF THE INVENTION

The present invention provides an interface environment of general applicability with respect to application programs utilizing a given operating system.

A program in accordance with the present invention simplifies communication between the user and the computer system. Specifically, the user predefines various commands, indicia of which are displayed on the computer display screen (e.g. a cathode ray tube). A respective command is then effected by designating the indicia of the command on the display screen with an indicator (e.g., cursor) and depressing a single button.

More specifically, indicia of at least one set of task definitions, which may be varied by the user, are stored in memory. A task name is assigned to each task. A task definition code string representative of input signals (e.g., keystrokes) for effecting a predetermined computer operation may be included in each definition. The task names are thereafter selectively displayed on the computer screen, and a given task can be selected by a visual indicator, e.g., a cursor. When a given task is selected, input signals corresponding to the task definition code string are generated as input signals to the computer.

In accordance with another aspect of the present invention, the instantaneous number of tasks in a given set of tasks is determined, and an appropriate geometry and format for an overlay display window to contain indicia of each of the tasks in the set is generated. The relative dispositions of the respective display indicia, e.g., names, in the overlay display window are specified, and indicia of their relative dispositions are stored. The overlay display window may be selectively displayed, and respective display indicia are displayed within the display window at positions according to their associated relative disposition indicia. The relative position of a movable visual indicator (e.g., cursor) within the window is then sensed to designate a given command.

In addition, in accordance with another aspect of the present invention, use of a mouse pointing device is facilitated by defining and storing respective mouse function definitions corresponding to each of the respective buttons and command movements associated with a mouse. Indicia of the mouse button or movement is stored together with a code string representative of the desired action to be taken.

BRIEF DESCRIPTION OF THE DRAWING

A preferred exemplary embodiment of the present invention will hereinafter be described in conjunction with the appended drawings, wherein like designations denote like elements, and:

FIG. 3 is a detailed schematic illustration of Housekeeping Block 66 shown in FIG. 1;

FIG. 6 is a schematic flowchart of an executable Interrupt Service routine in accordance with the present invention;

FIG. 7 is a detailed schematic flowchart of the "Execute Mouse Function" block shown in FIG. 6;

DETAILED DESCRIPTION OF THE PREFERRED EXEMPLARY EMBODIMENT

Figure 1:
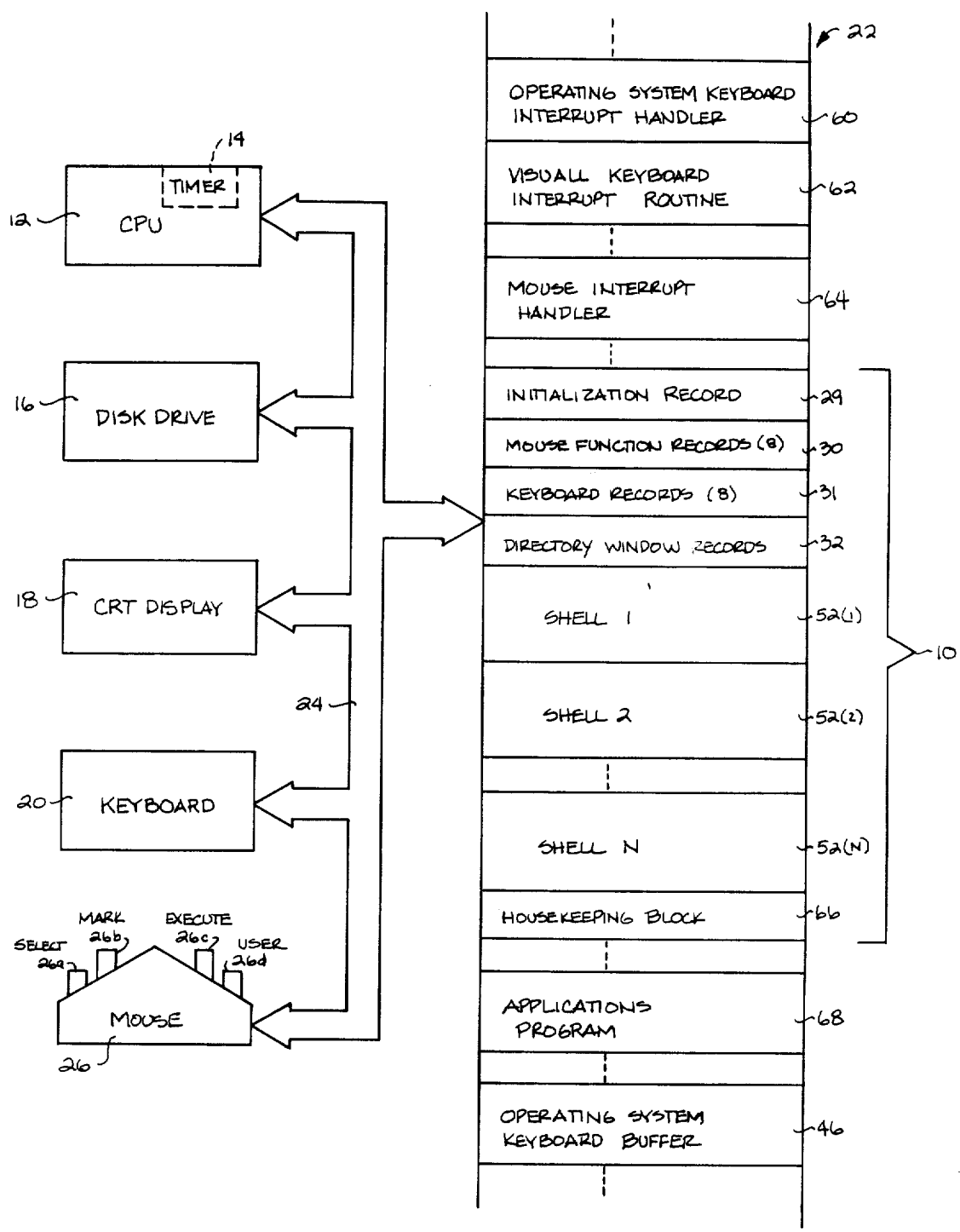
FIG. 1 shows a schematic block diagram of a computer system employing the present invention.

Referring now to FIG. 1, a computer system 10 incorporating an interface program in accordance with the present invention (referred to herein as the "VisuALL" program) typically includes a central processing unit (CPU) 12 (including a timer or clock 14), at least one conventional disk drive 16, a conventional CRT display 18, a conventional keyboard 20, and a conventional random access memory device (generally indicated as 22). Appropriate communications links and connections, generally indicated as 24, are provided between CPU 12, disk drive 16, CRT display 18, keyboard 20, and memory 22, as is well known in the art.

Keyboard 20 suitably includes a plurality of keys, nominally divided into two groups: standard alphanumeric typewriter keys, and special keys. Special keys include, for example, cursor control keys (rightarrow, leftarrow, uparrow, and downarrow), an "enter" key (which moves the cursor from the last character on one line to the first character on the next line, and sends a command to the system), a backspace key (which moves the cursor to the left and removes one character for each keystroke), an "ESC" (escape) key (which cancels all previously entered commands), and general purpose "function" keys (non-dedicated keys the functions of which may be user programmed). In addition, shift (s), control (c), and/or alternate keys are provided, whereby commands can be denoted by a combination of keystrokes.

In general, when a key on keyboard 20 associated with a particular character or command is depressed, an ASCII code indicative of that character or command is generated and communicated to an operating system keyboard buffer 46 in RAM 22. Computer system 10 periodically examines the contents of operating system keyboard buffer 46 (suitably through the handling of conventional input-generated interrupts), and captures and operates upon the buffer contents.

In addition to keyboard 20, computer system 10 preferably includes a suitable conventional mouse pointing device 26 for quickly positioning a cursor to a desired position on the screen of CRT display 18. Mouse 26 is suitably a small box which may be rolled on any flat surface. The mouse 26 is provided with sensors on its underside which sense the direction of movement and transmit that information to computer system 10. Mouse 26 is also provided with a plurality (suitably four) of mouse buttons 26a-26d. Execution of specified commands may be effected by depressing respective mouse buttons 26a, 26b, 26c, 26d, as will be explained. Mouse 26 is suitably of a commercially available type, such as the Mouse Systems Optical Mouse, the Microsoft Mechanical Mouse, or the LogiTech Mechanical Mouse. Depending upon the type of mouse pointing device 26 employed, the mouse would typically be coupled to the remainder of computer system 10 through either the keyboard communications port, one of a plurality (typically, two) of serial communications ports or a parallel input port. The keyboard communications port, the parallel input port and the serial communications ports are associated with respective conventional interrupt lines (not shown) within computer system 10, which carry input interrupt signals typically causing CPU 12 to respond in a predetermined manner (as will be explained).

As is well known in the art, disk drive 16 and RAM 22 cooperate to provide storage for various data. For the purpose of simplicity, it will be assumed that all operational data resides in RAM 22. However, data can be communicated between RAM 22, general purpose hardware registers (not shown) of CPU 12, and mass storage via disk drive 16, as is well known in the art.

The respective hardware components operate under the general control of a conventional program typically referred to as an "operating system." An example of such an operating system is the IBM Disk Operating System ("DOS"). The operating system accepts certain predetermined formatted commands (instructions) and typically provides various prompts to the user. For example, DOS provides a prompt (typically displayed on CRT Display 18) comprising a disk drive designator (visually the letters A or B) followed by a "greater than" (>) sign to indicate that the operating system is ready to accept a command. The operating system may perform a variety of hardware, software and data management functions (e.g. task scheduling, memory write protection, etc.) In addition, the operating system program typically also manages data storage, and the cooperation between RAM 22 and magnetic disk storage on disk drive 16.

Data is typically grouped in nominal, individually accessible "files" on mass storage accessible via disk drive 16. Respective operating system commands are typically provided to manipulate (access, create, alter, delete, copy, rename, display or print) the files. The operating system may also provide a number of specialized utility functions which perform a variety of specified tasks, as will be explained shortly.

Application programs (programs pertaining to a particular application or task) operate in the environment defined by the operating system program. The operating system program typically performs a variety of supervisory and control functions to enable one or more user tasks to be performed. For instance, the operating system program may create or remove tasks, allocate hardware resources among different tasks, provide interaction between different software tasks, control the progress of tasks, and handle error or other exceptional conditions arising during the operation of a task. The operating system typically permits the user to redefine or add to all but a small "kernel" of operating system programs or functions, so that different application programs can be presented with different "virtual machines" (i.e. computer system 10 and the computer operating system considered together as a whole).

Briefly, the VisuALL program provides a visual interface between a user and the operating system and/or an application program(s) by the selective display of respective display windows, each display window containing indicia of a group of tasks. A VisuALL "profile" database is provided to work in conjunction with a particular operating system. The profile database includes a respective nominal "shell" corresponding to each application program for which a VisuALL interface is to be provided. Each shell contains one or more display windows associated with the application program. Each window, in turn, has associated therewith one or more executable tasks. A respective task within a display window can be designated by movement of a display cursor, and predetermined actions associated with the task effected.

Figure 2A:
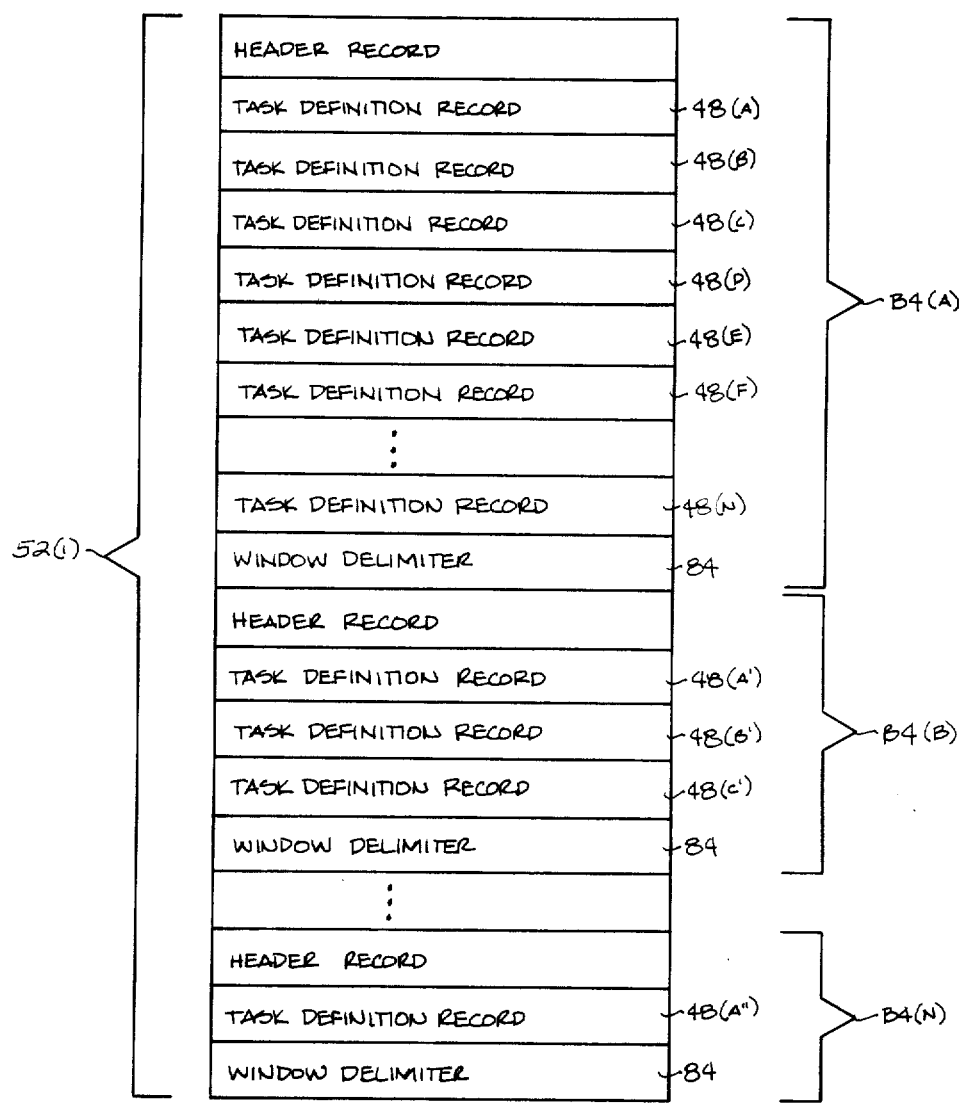
FIG. 2(A) is a detailed schematic illustration of shell block 52(1) shown in FIG. 1.

Referring to FIGS. 1 and 2(A), as will hereinafter be more fully explained, RAM 22 suitably includes a nominal portion or block corresponding to the structured profile database 102. Profile database 102 includes respective accessible (i.e., addressable), nominal divisions, as will be explained. For example, an initialization record 29 is provided corresponding to data pertaining to system parameters. Respective mouse function records 30 are also included, one corresponding to each of mouse buttons (26a-26d), and each mouse movement operation (up, down, left or right). Further, if desired, additional "keyboard" records 31 can also be included, corresponding to an assignment of respective mouse functions to designated keys on keyboard 20. RAM 22 also contains a plurality of directory window records 32, one corresponding to each window represented in the VisuALL profile database 102. RAM 22 also contains a nominal shell definition block 52 for each shell defined within profile database 102. Each shell definition block 52 includes at least one nominal window definition block 34 representing an "overlay window" to be displayed on CRT display 18. Each respective window definition block 34 contains one or more task definition records 48 (corresponding to tasks associated with the represented window, as will be explained).

Referring to FIGS. 1 and 3, RAM 22 additionally includes a nominal Housekeeping Block 66 containing respective nominal buffers and registers associated with the operation of the VisuALL program: a user response buffer 36; a temporary keyboard buffer 38; a current window number record 40; a delimiter counter 42; a save text buffer 44; a current cursor position record 45; a user command buffer 47; a command record pointer 46; a prompt flag 70; a keyboard flag 72; a window display flag 74; a mouse function record address pointer 76; a task definition record address pointer 77; a change button flag 78; plural button reserve function string records 80 (typically four); and a button command buffer 82. Associated with the operating system of computer system 10, RAM 22 also typically includes respective nominal buffers or other dedicated storage locations such as, for example, an operating system keyboard buffer 45.

With reference to FIGS. 1-4, the general operation of the visual interface program of the present invention will be described.

The "VisuALL program" typically comprises four nominal sections: a source code "profile" data file; a compiler module; profile database 102; and a run-time interrupt routine module. In general, a source code "profile" (data file) is generated through keyboard 20 (or provided prestored via disk drive 16) (step 202). The profile data file is then compiled by, for example, executing a software compiler module to create the structured profile database 102 in RAM 22 (step 204). Briefly, indicia of data contained in the source code data file pertaining to system parameters are stored in initialization record 29, mouse function records 30 and keyboard records 31, while data contained in the source code data file pertaining to the visual interface respective to particular application programs are stored in nominal shell definition blocks 52.

Compilation step 204 is typically performed by loading a VisuALL compiler object code program module into RAM 22 (step 203). This compiler module is typically provided prestored via disk drive 16. The VisuALL compiler program is then executed conventionally under the IBM Disk Operating System (similar to any application program). The VisuALL compiler program accepts as an input the source code profile data file from disk drive 16, and generates structured database 102 discussed above.

The compilation step 204 is conventionally performed. Compilation step 204 includes a conventional parsing step (not shown) which takes the source code data of the profile data file, breaks up the source code data into functional units (according to rules of "grammar" defined by the "VisuALL language"), and then generates object code corresponding to the source code. Compilation and parsing techniques are well-known in the art, and may be adequately described by specifying the language (i.e. the grammar) of the source code data and the format of the output of the compiler (in this case, structured profile database 102).

After the input data has been compiled and the profile database 102 created in RAM 22 (step 204), indicia of positional coordinates are assigned to each task in the group of tasks associated with respective windows, and indicia of the positional coordinates are entered into associated task definition records 48 in database 102 (step 206). The assignment of coordinates to the respective tasks will be hereinafter more fully described in conjunction with FIG. 5.

Once the positional coordinates indicia have been entered in the respective task definition records (step 206), the VisuALL program is "made resident" (step 208), as will be explained. Briefly, the run-time object code module of the VisuALL program is provided via disk drive 16 (if it was not already provided together with the compiler module in step 203), and this run-time module is made to appear to an application program executing on computer system 10 as an extension of the operating system. More specifically, the run-time module operates in conjunction with a operating system interrupt handler to respond to input interrupts. Individual actions under the VisuALL program are initiated by either moving mouse 26, depressing one of mouse buttons 26a-26d, or depressing corresponding buttons on keyboard 20. The VisuALL interrupt routine module in conjunction with the operating system interrupt handler detects mouse or keyboard action, and effects operations accordingly. While the interrupt routine module could comprise conventional digital logic circuits, it typically includes or comprises object "machine" code by CPU 12 to increase flexibility (e.g. to permit modifications to be more easily performed and to allow the use of general purpose rather than dedicated hardware).

In practice, functions to effect display of respective display windows and to effect entry of designated commands are typically assigned to respective ones of the mouse buttons. Depression of the appropriate mouse button may cause display of a directory window (represented by directory window records 32) containing indicia of each window represented in profile database 102. The cursor may then be manipulated to designate a given display window, and the appropriate mouse button depressed to effect display of the designated window. A desired individual task (which may include commands to be communicated directly to an application program, one or more VisuALL commands cognizable to the VisuALL program, or both) may then be selected by movement of the cursor within the window. This task may be executed by depression of an appropriate mouse button. Tasks causing display of the directory window or other display windows are typically included within each window to facilitate selective display of any of the respective windows represented in profile database 102. The execution of functions and display of windows will be described more fully in conjunction with FIGS. 6 through 14.

As will be explained in conjunction with FIGS. 6 and 8(A)-8(B), when a task is designated and an enter command effected (typically by depressing a mouse button assigned to that function), any required response by the user is collected and, if appropriate, interjected into a character string set out in the task definition. The composite character string is then loaded into temporary keyboard buffer 38 for subsequent serial (character by character) communication into the operating system keyboard buffer 46. The character string thus appears to the operating system as if it had been keyed in through keyboard 20. VisuALL commands contained in the task definition records 48 are detected and concomitant action taken by the VisuALL program.

A user may define the contents of shells and windows, functions of the buttons and movements of mouse 25, the various tasks which may be performed, etc. By specifying the contents of the source code profile data file. The source code data file is typically created and edited using a conventional text editor executing on computer system 10. A statement of the source code profile data file may be written in the VisuALL source code "language" in one of two formats: initialization "format" (which is used by compilation step 204 to insert values into initialization record 29 of profile database 102); or in "executable" command string format (which is used by compilation step 204 store data in data base 102 to cause a specified action to occur at a later time in response to mouse movements, the depressions of mouse buttons 26a-26d or the depression of keys of keyboard 20). Most VisuALL commands may appear in either the initialization or the command string format, and their functions in each are similar. Thus, in general, any task which the VisuALL program is capable of performing may be specified either upon initialization of profile database 102 or upon interaction by the user with the VisuALL program at a later time.

Source code corresponding to initialization information is suitably included at the beginning of the profile data file. The initialization information may include, for example, indicia of the interface speed (baud rate) of the mouse (specified by the mouse manufacturer), and type of mouse. VisuALL commands used to generate initialization record 29 typically may not be written in "executable" command string format. The contents of initialization record 29 generally depends only upon the particular type of mouse pointing device 26 which is employed, and thus rarely, if ever, need to be changed. Likewise, once particular keys of keyboard 20 are assigned to particular mouse functions, it is rarely, if ever, necessary to change such assignments. For this reason, the VisuALL commands which initialize computer system 10 with system parameters associated with interfacing the mouse 26 with the computer system may typically only be written in initialization format.

Initialization information may also include function data defining the initial operation of each of the mouse buttons, e.g., 26a (select), 26b (mark), 26c (execute) and/or 26d (user), and each of the sensed directional movements of mouse 26 (right, left, up, down). The mouse function data is typically utilized to correlate movement of the cursor with physical movement of the mouse, and to define the actions performed in response to depressing the mouse buttons 26a-26d. Indicia of such mouse function data is stored in mouse function records 30 (in RAM 22).

The use of mouse 26 is not requisite to the present invention. Mouse functions can be assigned to respective keys of keyboard 20. To this end, initialization information also includes additional data entries corresponding to each of the mouse buttons, whereby mouse functions such as cursor movement and mouse buttons are assigned to user specified keys of keyboard 20. Indicia of keyboard assignment data are stored in keyboard records 31.

As noted above, the profile database 102 also includes respective nominal shell definition blocks 52(1)-52(N) each of which may correspond to particular applications programs for which the VisuALL program is to provide a visual interface. Thus, included in the source code profile data file is also source code corresponding to shell definition data. Shell definition data is used to assign designator indicia (e.g. names) to one or more display windows associated with the applications program; to assign command (task) designator indicia for tasks associated with each of the windows; and to define actions to be performed by each task.

The shell definition data suitably includes respective task definition entries and appropriate delimiters indicative of groupings of task, i.e., designations of the display windows with which the tasks are associated. The task definition data would include a task name and an associated task definition comprising character strings and/or VisuALL commands. As noted, each display window has associated therewith a respective directory window record 32 and a group of task definition records 48 (contained in a respective window definition block 34). The directory window record 32 is utilized to assign a name or other designation to the window, and to index (or otherwise provide a link to) the group of task definition records 48 associated with the window. The task definition records associate respective tasks with a position in the display window and define the respective functions to be performed when a task is executed.

The "VisuALL language" (the form of the source code profile data file) comprises one or more statements including respective operator symbols, strings of character information, and a plurality of "VisuALL commands." The VisuALL commands and operations facilitate system initialization; cursor movement; and creation, change and manipulation of respective windows. Various of the VisuALL commands and operations will hereinafter be described.

For example, a single quote (') operator in the VisuALL language is used to denote character strings to be communicated to the operating system without compilation by the VisuALL program. Characters appearing between single quotes (') are interpreted by the VisuALL program directly as strings, i.e., an ASCII representation of each character appearing between single quotes is provided to the operating system. Blank spaces separate different commands in the same command line from one another. A plus sign operator (+) is used to denote command line continuation (i.e. command lines too long to fit on one line may be extended by the plus sign operator to two or more lines). A semicolon (;) is used as a comment delimiter (all characters following a semicolon are considered to be part of a comment and thus are to be ignored by the VisuALL program). To denote the use of one of the operator symbols as a character to be directly communicated to the computer operating system, a back slash (/) operator is utilized. A back slash (/) preceding a special character (operator symbol) such as the plus sign, single quote, or a back slash will cause the VisuALL program to interpret the special character as a character to be communicated to the operating system, as opposed to an operating symbol.

An equal sign (=) is utilized as a "definition" operator to assign a value (either VisuALL commands or keystrokes cognizable by the application program) to a variable (for instance, a mouse function or a task name character string).

Several VisuALL commands are provided to facilitate initialization of the system to define system parameters associated with interfacing the mouse 26 with computer system 10 (and thus to create initialization record 29): SYSTEM, BAUD, COMM, and MOUSE. The SYSTEM command is utilized to set up system parameters for initialization, and, in effect, accesses initialization record 29 for data entry.

The BAUD command is used to specify the baud rate (speed) at which mouse 26 will communicate with computer 10. Indicia of the baud rate are maintained within the initialization record 29. The system is designed to accommodate baud rates of 300, 1200, and 9600. In the event that no baud rate is specified, a default value of 1200 is assumed. An exemplary format is as follows: BAUD=1200.

The COMM command is utilized to specify a serial port number (associated with communications network 24) through which mouse 26 is to communicate with the remainder of computer system 10. The COMM command is typically utilized in initializing the system (i.e. to store data in initialization record 29). A format example is as follows: COMM=1.

The MOUSE command is utilized designate the specific name of the mouse 26 used. A mouse name specifies a mouse type, i.e., different mice might be specified by "serial", "parallel" and "keyboard" designations, as will be explained.

The INTERRUPT command is provided to vary the particular interrupt line of computer system 10 which is used by the serial communications port specified by the COMM command, if desired.

Other VisuALL commands are provided for correlating the operation of mouse 26 with movement of a cursor on display 18, and to define the particular actions to be taken in response to depression of the respective mouse buttons 26a14 26d: BUTTON, SELECT, MARK, EXECUTE, USER, CURSOR, RIGHT, LEFT, UP, DOWN, SPEED, KEYBOARD, FLY, and RESTORE.

The SELECT, MARK, EXECUTE, and USER command words are utilized (typically in conjunction with the BUTTON and KEYBOARD commands, as will be explained) to designate mouse buttons 26a-26d, respectively. Similarly, the commands RIGHT, LEFT, UP and DOWN are used (typically in conjunction with the CURSOR and KEYBOARD commands) to designate the respective sensed directions of the movement of mouse 26.

The BUTTON command is used to assign "functions" to mouse buttons, 26a-26d, (i.e., to create respective mouse function records 30 corresponding to the functions of the mouse buttons). As will be explained, the function definition strings defining such functions can comprise keystrokes (equivalent to ASCII characters) for compiled communications to the computer operating system or other application program (using the ' operator) and/or other VisuALL commands.

The BUTTON command can be utilized in either the initialization or in the command string format. The first format is used in initialization, i.e., to initially create mouse function records 30 corresponding to the mouse buttons. An example of the initialization format is as follows:

| BUTTON |
|---|
| SELECT = COMMAND |
| MARK = ENTER |
| EXECUTE = 'string' |
| USER = 'string' |

(where ENTER and COMMAND are both VisuALL commands to be discussed shortly, and string is a character string to be communicated to the application program).

The button initialization data must be provided in the source code profile data file prior to the "keyboard initialization section" (used to assign mouse functions to specified keys of keyboard 20).

The BUTTON command can also be used in the context of a task definition as an executable statement to change the function assigned to a mouse button after initialization has occurred. An example of such a use of the BUTTON command is as follows:

Change SELECT button = BUTTON +

(SELECT = 'string' ENTER)

The above example, when executed, will change the function of the select button 26a of mouse 26 from a previous function to one that will transmit string (followed by the ENTER command, as previously described) to the application program. String should be one or more keystrokes which are cognizable by the application program.

Note that in the command string (i.e. "executable") format, the character string of a task definition statement on the left-hand side of the definition operator (=) typically is not interpreted by the VisuALL program, but rather is displayed within the respective window containing the task definition statement to permit a user to select the task associated with it for execution. Only the source code appearing on the right-hand side of the definition operator (=) is actually "executed" by the VisuALL program (and thus must comprise either commands cognizable by the VisuALL program, keystrokes of a format capable of being interpreted by the application program, or both). Thus, the phrase "Change SELECT Button" is typically merely a descriptive message to the user which permits the user to select the task defined by the command string on the right-hand side of the definition operator. This descriptive message could, of course, take any form desired by the user (for instance, it could be written in a non-English language or in a way which had meaning only to particular users). By permitting the user to define both the descriptive message on the left-hand side of the equal sign and the VisuALL command string to which it corresponds, the user may, in effect, completely specify the inputs and the outputs of the VisuALL program.

In the event that no function is assigned to the mouse buttons, a default condition, as follows, is established by the compilation step 204.

```
SELECT = COMMAND
  MARK = ENTER
EXECUTE = ENTER
  USER = ENTER
```

The ENTER command corresponds in function to the "enter" key on keyboard 20 (as was previously described).

The RESTORE command permits a mouse button to resume an original function after an intervening change by a BUTTON command. The user is thus enabled to change the function of a mouse button each time the button is pushed, but to eventually return to the original function of the button. An example of the use of the RESTORE command to provide a "toggle" action between printing respective character strings is as follows:

Toggle button = BUTTON(MARK = 'A' +

BUTTON(MARK = 'B' RESTORE))

The task named "toggle button" defined in the preceding example causes the letter "A" to be sent to the application program the first time the mark button is depressed, and then reconfigures the button to send to the application program the letter "B". The next time the mark button is depressed, a "B" is sent to the application program, and the RESTORE command is executed. The RESTORE command reconfigures the mark button to send the letter "A" to the application program when next depressed (and so on). Using nested BUTTON commands and the RESTORE command, a button can be made to assume many different functions before being restored to its original function. An example of a three function button usage is as follows:

Move text = BUTTON(MARK = 'mark_beg' +

BUTTON(MARK = 'mark_end' +

BUTTON(MARK = 'exec_comm' RESTORE)))

In the above example (assuming that the application program recognize the strings "mark_beg", "mark_end" and "exec_comm" as having the described functions), the beginning of a block of text is marked the first time the mark button is depressed; the end of the block of text to be moved is marked the second time the mark button is depressed; the third time the mark button is depressed, the block of text is actually moved, and the RESTORE command is executed, reconfiguring the mark button to its initial state.

Although mouse pointing device 26 has been previously described as having four mouse buttons 26a-26d, the mouse 26 need only have two buttons, the select and the mark buttons. Typically, the select button will be assigned a function (by the BUTTON and RESPONSE commands discussed above) which results in effecting display of one of the windows represented by window definition blocks 34 of profile database 102 the first time it is depressed, and to cause execution of the one of the tasks associated with the displayed window to which the cursor points the second time it is depressed. Thus, the mouse select button 26a is typically used to interact directly with the VisuALL program. The mark button 26b, on the other hand, is typically used to interact with the application program (and in partiqular, to specify parameters to the application program by specifying (in conjunction with the movement of the mouse 26) positions on CRT display 18). Thus, in the above example, the MARK button in conjunction with the cursor is used to delimit and move a block of text (e.g. by communicating with a text editor application program). Of course, the user may assign any functions desired to any of the mouse buttons 26a-26d. However, it has been found that due to the resulting simplicity of operation, the division of functions between the select and the mark buttons as described above is an optimal configuration for the buttons.

The CURSOR command is used to assign "functions" to mouse movements. Each cursor command generates a "cursor" record (maintained as one of mouse function records 30). The cursor record suitably comprises fields representative of the movement designation, corresponding functions and an appropriate delimiter, as will be explained. The assigned functions can be keystrokes and/or VisuALL commands. As with the BUTTON command, the CURSOR command can be used in an initialization format or in the context of an executable task definition to effect a change of the function assigned to mouse movements during the course of interaction of the user with the VisuALL environment. An example of the initialization format (which happens to be the conditions assigned to default) is as follows:

```
CURSOR

LEFT = LEFTARROW
RIGHT = RIGHTARROW
   UP = UPARROW
 DOWN = DOWNARROW
```

An example of a task definition using the CURSOR command is as follows:

```
Fly the cursor  =         +
CURSOR (LEFT  = FLY) +
CURSOR (RIGHT = FLY) +
CURSOR (UP    = FLY) +
```

-continued

| |
|---|
| Fly the cursor = + |
| CURSOR (DOWN = FLY) |

The FLY command (shown in the preceding example) is utilized to put the cursor in a "direct addressing" mode (to be described in greater detail shortly). This permits movement of the cursor across the screen of display 18 even in a non-screen oriented environment (i.e. without affecting the application program). When the cursor is in a FLY mode, the application program with which the VisuALL program is providing an interface is not affected by the cursor movement (i.e. VisuALL directly, rather than through the application program, causes the cursor to move). The FLY command is typically used in connection with the CURSOR command as previously described. In the event that the FLY command is not utilized, the cursor is moved by the operating system or the application program (e.g. VisuALL sends arrowkey codes to the operating system keyboard buffer 46, and the operating system responds by moving the cursor appropriately).

The SPEED command is used to specify the rate at which the cursor will move in relation to the movement of mouse 26. The rate of relative speed is scaled from 0 (slowest) to 10 (fastest). The speed of the cursor movement can be chosen in accordance with the size of areas traversed and indicated by the cursor. The SPEED command is typically utilized in conjunction with the CURSOR command and typically affects cursor speed only when a display window is not being displayed. An example of an initialization usage is as follows:

| |
|---|
| Cursor |
| SPEED = 5 |

Alternatively, the cursor speed can be changed in the context of an executable task using the following format:

Change Cursor speed = CURSOR (SPEED = 5)

As previously noted, use of a mouse 26 is not requisite for the VisuALL program. The KEYBOARD command enables the VisuALL program to be used without a mouse or, alternatively, to define an interface for a mouse that plugs directly into a keyboard socket associated with computer system 10. Specifically, as previously mentioned, the respective mouse buttons and movements can be equated with various of the keys on keyboard 20. The KEYBOARD command is utilized to effect such a correspondence in the initialization portion of the source code profile data file (to initialize initialization record 29 appropriately). An example of the usage of the KEYBOARD command is as follows:

| |
|---|
| KEYBOARD |
| MARK = F9 |
| DOWN = 'd' |

The foregoing statement assigns the function of "mark" mouse button (26b) to keyboard 20, "function" key 9, and assign to the "d" typewriter key of keyboard 20 the function assigned to a downward movement of mouse 26.

A default condition is suitably chosen, which permits the VisuALL program to operate without a mouse:

| |
|---|
| SELECT = s-F1 |
| MARK = s-F2 |
| EXECUTE = s-F3 |
| USER = s-F4 |
| UP = UPARROW |
| DOWN = DOWNARROW |
| LEFT = LEFTARROW |
| RIGHT = RIGHTARROW |

The shifted function keys 1, 2, 3 and 4 correspond to the SELECT, MARK, EXECUTE and USER mouse buttons, respectively. Arrowkeys are used to move the cursor.

Commands are also provided to facilitate the structuring of nominal shell definition blocks 52(1)-52(N) pertaining to a particular application. Generally, as mentioned previously, a different one of nominal shell definition blocks 52(1)-52(N) may be provided for each different application program with which the user wishes to communicate via the VisuALL program. Examples of commands pertaining to the structuring of data shells are: SHELL, ADDSHELL and DELSHELL.

The SHELL command is used to delimit the beginning of the sections of source code in the source code profile data file corresponding to each of nominal shell definition blocks 52(1)-52(N). A SHELL command would typically appear in the profile data file prior to every shell "body" (i.e. the source code definition data corresponding to the collection of windows to be contained within a respective nominal shell definition block), and is a prerequisite to proper functioning of the ADDSHELL and DELSHELL commands. A format example is as follows:

SHELL (DOS COMMANDS)

The above example specifies a shell to be used to generate DOS COMMANDS (i.e., a shell which contains commands for communicating with the disk operating system).

ADDSHELL and DELSHELL commands are "external" to the VisuALL "environment", and thus may be considered analogous to the VisuALL compiler module in that they run directly under the operating system. These commands permit a user to add and delete various ones of nominal shell definition blocks 52(1)-52(N) from profile database 102 by adding and deleting shell source code files from the source code profile data file.

The ADDSHELL command is used to add source code corresponding to a nominal shell definition block to the source code profile data file. ADDSHELL which can be invoked from keyboard 20. An exemplary format is as follows:

ADDSHELL SHELLFILENAME
PROFILENAME

The "shellfilename" designates the file in which the new shell is found (and is also utilized as the shell name). The file names may include disk drive designators, if desired (if more than one of disk drives 16 is used).

The DELSHELL command is used to delete a shell from the profile data file. Like the ADDSHELL command, DELSHELL can be invoked from keyboard 20. A format example is as follows:

DELSHELL SHELLNAME PROFILENAME

Such a statement will cause the shell named SHELLNAME to be deleted from the source code Profile data file PROFILENAME.

ADDSHELL and DELSHELL typically do not operate on the structured profile database 102 stored in RAM 22, but rather upon the source code profile data file accessible via disk drive 16. ADDSHELL and DELSHELL typically function by respectively adding and deleting code corresponding to window definition blocks from the profile data file. This operation is performed using standard commands made available by, for instance, the operating system or a text editor application program. The ADDSHELL command merely appends a user-defined file (typically accessible via disk drive 16) to the profile data file. The DELSHELL command, on the other hand, merely searches the source code profile data file to find both the SHELL statement associated with the specified SHELLNAME and the beginning of the next shell in the profile data file (which will be indicated by another VisuALL SHELL command), and then deletes all of the text between those two (including the SHELL command for the shell to be deleted). The procedures used to modify a file by searching for adding and deleting text are, of course, well known in the art.

Once the ADDSHELL and/or DELSHELL command has been executed, the modified profile data file must be newly compiled by compilation step 204 (shown in FIG. 4) in order to create a new structured profile database 102 stored in RAM 22 reflecting the modification.

From the above discussion, it will be apparent that the nominal shell definition blocks 52(1)–52(N) in the structured database in RAM 22 are nominal divisions only. The "shell" construct has real significance only in terms of the ADDSHELL and DELSHELL commands. While the construct of shells permits a user to structure his or her source code programming, the VisuALL program does not itself differentiate windows as being included in one shell or another.

An END command is provided at the end of the source profile data file for use as a delimiter (to indicate the end of a VisuALL source code profile data file).

As previously noted, commands are provided to facilitate creation, change, and manipulation of respective display windows. Examples of such are WINDOW, COMMAND, and DIRECTORY commands, described as follows:

The WINDOW command when it appears as part of an "executable" task definition statement will cause the window which it specifies to become the new current window (and thus permits the selective display of any one of the display windows represented in profile 102). Additonally, the WINDOW command is used in initialization to establish the respective directory window records 32 and window definition blocks 34. Thus, the WINDOW command is used in one of two contexts: to initially establish the window; or, in the context of an "executable" task definition statement, to permit selection and display of a window other than the present window. An example of the initial definition of a window is as follows:

| Window (Editor Commands) |
|---|
| Go to top of file = 'c-PgUp' |
| Unmark block = 'a-u' |

The name assigned to the given window is provided within parentheses, and, in the preferred embodiment, must be 18 characters or less.

An example of utilizing the WINDOW command as part of a task definition is as follows:

Edit a file = WINDOW (Editor Commands)

When the above task definition statement is executed, the current window will become a window named "Editor Commands".

The COMMAND command is used to effect the display of the current window on the screen of CRT display 18. As will be described in greater detail shortly, the current window is that window which is pointed to by a current window number record 40 of RAM 22. In a default condition, the "current" command window is assumed to be the first sequential window definition block 34 of profile database 102. The COMMAND command can be utilized in the context of either an initialization statement or a task definition. An example of such an initialization format is as follows:

BUTTON (SELECT = COMMAND)

The foregoing would initialize the function of the select button 26a of mouse 26 to cause the current window to be displayed on CRT display 18 whenever the "select" mouse button is depressed. As will be explained, if the select mouse button 26a is depressed when the current window is already being displayed, then depression of the select mouse button 26a (i.e. typically a second depression of the button) will cause the task definition statement contained by the current window to which the cursor is pointing to be executed. If the cursor is pointing to an area outside of the current window and the current window is being displayed, depression of the select mouse button 26a will cause the display of the current window to be "terminated" (i.e. the current window will cease being displayed and the display generated by the application program will return to CRT display 18).

The COMMAND command can also be used in connection with the calling up of a new current window. An example of such a format is:

More = WINDOW (MORE DOS COMMANDS) COMMAND

The foregoing sequence would cause the window named "MORE DOS COMMANDS" to become the new current window and to be displayed.

The DIRECTORY command is utilized to invoke a display of a directory window (and thus to display indicia of the respective windows reflected in the directory window records 32). The DIRECTORY command is utilized in the context of task definitions. A format example is as follows:

Dir of windows=DIRECTORY

The foregoing statement will cause a directory (listing) designation indicia (e.g. names) of all windows represented in profile database 102 to be displayed when the "Dir of windows" task is selected to be executed, as will be explained.

Respective source code commands are also provided to render the execution of functions conditional upon various parameters, and to permit user interaction to intervene between the VisuALL program and the operating system. Examples of such are IF, NOT, VERIFY, PROMPT, FPROMPT, SPROMPT, and RESPONSE commands.

The IF command causes a function associated with one of mouse buttons 26a-26d or mouse movements to be executed only if the cursor is in a prescribed position (i.e., column, line) or area on the CRT display screen 18. An example of the use of the IF command is as follows:

CURSOR (RIGHT=IF (COLUMN LINE 'string'))
COLUMN and LINE are typically coordinates (numerals) representing the cursor position on the display screen. The COLUMN and LINE coordinates can be ranges of values, if desired. The function defined by 'string' is executed only when the cursor position is within the range defined by COLUMN and LINE.

The NOT command is used in conjunction with the IF command to make execution of a defined function conditional with respect to cursor position. A format example of the NOT command is:

CURSOR (RIGHT=IF NOT (COLUMN LINE 'string'))

The 'string' is executed only when the cursor is not in the position defined by coordinates COLUMN and LINE. Again, COLUMN and LINE can be ranges of values, if desired, e.g., 0-23.

The PROMPT, FPROMPT and SPROMPT commands are utilized to prompt the user to invoke a response. An example of a PROMPT command usage is as follows:

Type file='type' PROMPT (file name:) ENTER
The parenthetical prompt message, i.e., "file name" in the example, is displayed at a predetermined position (referred to as the "prompt window") on the screen of display 18. In response to the prompt, the user might key in (through keyboard 20) an appropriate string of characters, e.g., a file name. In some instances, when the user does not wish to respond to a prompt, the enter key may be depressed on the keyboard to invoke continuation of processing. As will be explained, the user response to the prompt is communicated to computer system 10 in conjunction with the remainder of the keystrokes contained in the task definition.

The FPROMPT (file prompt) command has a function identical to that of PROMPT except that it additionally automatically displays a window containing the names of all of the data files accessible via disk drive 16. A user may point to one of the displayed file names with the cursor (by moving mouse 26) and press the select mouse button 26a to enter the selected file name in response to the prompt (hence, the user need not operate touch keyboard 20 to select a desired file).

The SPROMPT (silent prompt) command operates in a manner essentially identical to the PROMPT command, except that the user response is communicated to the VisuALL program only (not to the operating system or application program). This permits, in conjunction with the RESPONSE command, for conditional VisuALL branching, thus allowing the user to select between execution of different VisuALL commands which are part of the same task definition. An example of such a usage is as follows:

Switch windows = SPROMPT (Are you sure: Y/N) +

RESPONSE ('Y') WINDOW (DOS +

COMMANDS) ENTER

The RESPONSE command provides for conditional branching or to cancel the effect of a previous RESPONSE command. When a RESPONSE command follows an SPROMPT command, the commands following the RESPONSE command are executed only if the user response to the prompt matches the designated response (i.e., 'Y' in the above example). If the user response does not match the parenthetical predetermined response, none of the commands following the RESPONSE command will be executed.

The PROMPT, SPROMPT and RESPONSE commands can also be used in conjunction with the NOT command to designate an alternative branching. An example is as follows:

Switch windows = SPROMPT (Are you sure: Y/N) +

RESPONSE ('Y') WINDOW (DOS +

COMMANDS) RESPONSE NOT ('Y') +

WINDOW (123 COMMANDS) ENTER

In the foregoing example, if the user response to the prompt is 'Y', the current window will be changed to the "DOS commands" window. If the response is not 'Y', the current window will be changed to the "123 commands" window. RESPONSE commands will remain in effect until another RESPONSE command occurs.

A null form of the RESPONSE command, RESPONSE ( ), is utilized to cancel the effect of a previous RESPONSE command, making subsequent commands in the same task definition statement unconditional notwithstanding the presence of a previous RESPONSE command. An example of such usage is as follows:

Switch windows = SPROMPT (Are you sure: Y/N) +

RESPONSE ('Y') WINDOW (DOS +

COMMANDS RESPONSE ( ) COMMAND + ENTER

In the above example, each command after the null response, i.e., "RESPONSE ( )", will be executed regardless of whether a 'Y' was entered in response to the prompt. Hence, the COMMAND command will be unconditionally executed to display the current window.

The VERIFY command is used to make the execution of VisuALL commands conditional upon the existence of a file residing on mass storage and accessable via disk drive 16. An example of such a usage is as follows:

123=VERIFY (filename) WINDOW (123 COMMANDS)
In the above example, the current window would be changed to window "123 COMMANDS" only if the filename is accessible via the default one of the disk drives 16. Filename may be qualified to designate a particular one of disk drives 16.

Other source code commands are provided to facilitate definition of tasks and sequential operations. Examples of such are CLEAR, DELAY and NOACTION.

The CLEAR command is used to clear operating system keyboard buffer 46 between respective commands in order to ensure that no previous command interferes with the present command. In the event that the CLEAR command is not used, the operating system keyboard buffer 46 typically retains its previous contents, (i.e., a previously entered command). The operating system typically provides that by depression of the rightarrow key of keyboard 20, the previously entered command stored in keyboard buffer 46 will be "uncovered" one character at a time (so that a user need not reenter the entire previously entered command to correct, for instance, a single incorrectly entered keystroke). Because the VisuALL program may enter a rightarrow character into the operating system keyboard buffer 46 to move the cursor to the right on CRT display 18, a previously entered command may be accidentally "uncovered" by the VisuALL program. The CLEAR command clears the contents of keyboard buffer 46 (typically by sending to operating sytem the ESC character, as previously described).

The DELAY command is used to cause a delay between the execution of VisuALL commands. In the absence of a DELAY command, no delay is deployed between commands. A format example is as follows:

DELAY (10)
Such a statement will cause a delay of 10 seconds to occur before the next command is executed. The DELAY command is typically used to provide computer system 10 sufficient time to complete a task which the VisuALL program requested it to perform before VisuALL requests that another task be performed (thus, the risk that the second task will never be properly communicated to and/or executed by the application program may be avoided). For instance, the DELAY command finds The NOACTION command can be used any where that a VisuALL command can be used on the right side of a equal sign, as a NOP or other null command. For example, it may be used to turn off a previously defined function of one of mouse buttoms 26a-26d or one of the four mouse movements. An example of usage of the NOACTION command is as follows:

BUTTON (SELECT=NOACTION)

Such a statement, in effect, renders the select mouse button 26a non-functional until a BUTTON command later assigns a function to it. NOACTION might be used, for instance, to require a user response to be entered in through keyboard 20, or to deactivate the previous function of the mouse button or movement without substituting a new function in its place (for instance, to restrict cursor movement to along a horizontal or a vertical line).

An example of a standard VisuALL source code profile DATUM is as follows:

```
; STANDARD VISUAL PROFILE
SYSTEM
BAUD = 1200                    ;1200 baud rate
COMM = 2                       ;Comm port 2.
MOUSE = Microsoft              ;parallel type
                               ;mice are enabled)
BUTTON
SELECT = COMMAND               ;Displays the current
                               ;command menu.
MARK = ENTER
EXECUTE = ENTER
USER = ENTER
CURSOR
RIGHT = RIGHTARROW
LEFT = LEFTARROW
UP = UPARROW
DOWN = DOWNARROW
SPEED = 7
KEYBOARD
SELECT = s-f1
MARK = s-f2
EXECUTE = s-f3
USER = s-f4
UP = UPARROW
DOWN = DOWNARROW
LEFT = LEFTARROW
RIGHT = RIGHTARROW
; * DOS COMMANDS WINDOW*
WINDOW (DOS COMMANDS)
Help = WINDOW (DOS HELP) COMMAND
Display window = DIRECTORY
directory = DIRECTORY
List files on a = 'dir a:' ENTER ;Strings are
  ;sent to DOS
List files on b = 'dir b:' ENTER
Copy file = 'copy' PROMPT (from: ) +
PROMPT (to: ) ENTER
Type file = 'type' FPROMPT (file +
name: ) ENTER
Print file = 'type' FPROMPT (file +
name: ) ENTER
Delete file = 'erase' FPROMPT (file +
name: ) ENTER
Rename file = 'rename' PROMPT (from: ) +
PROMPT (to: ) ENTER
Compare files = 'comp' PROMPT (compare +
file 1: ) PROMPT (with +
file 2: ) ENTER
Format disk = 'format/s' ENTER
Copy disk = 'diskcopy' ENTER
Check memory = 'chkdsk' ENTER
END
```

As previously noted, after the source code profile data file has been entered (step 202), it is compiled to generate a structured profile database 102 in RAM 22 (step 204). In general, upon compilation, each keystroke character and VisuALL command specified by the source code is identified by a unique 8 bit code. Keystroke characters (within single quote (') operators) and standard keys having word designations (e.g., enter, uparrow, etc.) preferably are each represented by a code having a zero (0) in teh most significant bit thereof, with the seven (7) least significant bits reflecting the satndard ASCII code for the particular keystroke character. VisuALL commands, on the other hand, are each represented in profile database 102 by a single 8 bit code having a one (1) in the most significant bit (and thus have a value greater than $7^F$HEX). In this way, the VisuALL program can easily distinguish between keystrokes intended to be transmitted to an application program and VisuALL commands simply by testing a single bit.

One mouse function record 30 and one keyboard record 31 are created corresponding to each of mouse buttons (26a-26d) and each of the directions of mouse movement (up, down, right, left). As noted, the mouse function records 30 are utilized to assign user variable functions to the respective mouse buttons and movements. Keyboard records 31 are utilized to equate (i.e., assign the functions of) the various mouse buttons and movements to particular keys of keyboard 20.

Figure 2B:
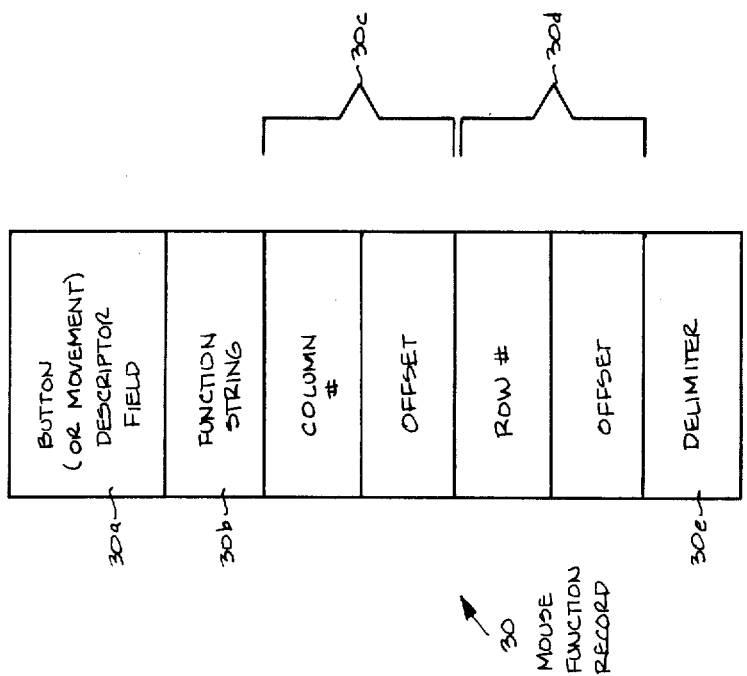
FIG. 2(B) is a detailed schematic illustration of an exemplary format of one of Mouse Function Records 30 shown in FIG. 1.

Referring to FIG. 2(B), each of mouse function records 30 suitably includes a button or movement descriptor field 30a (containing indicia of the mouse button or movement to which the record corresponds), a function string field 30b (containing a string codes one byte each corresponding to either VisuALL commands, keystrokes to be communicated to the application program, or both) defining the function to be performed when the respective mouse button is depressed (or mouse movement occurs), cursor range fields 30c and 30d indicative of a permitted cursor coordinate range outside of which the function of the associated mouse button or movement may be inhibited (for column and row cursor position coordinate ranges, respectively), and an appropriate predetermined delimiter 30e (indicative of the end of record).

Figure 2C:
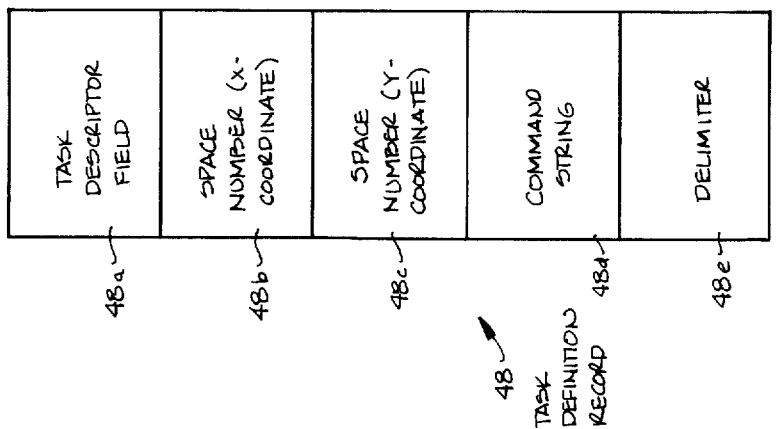
FIG. 2(C) is detailed schematic illustration of an exemplary format of one of Task Definition Record 48 shown in FIG. 2(A)
Figure 2D:
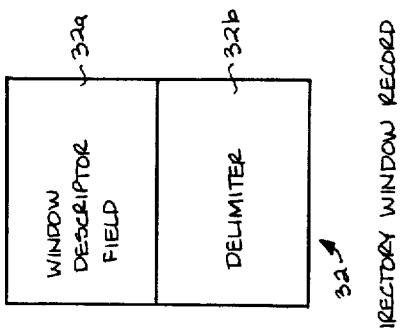
FIG. 2(D) is a detailed schematic illustration of an exemplary format of a Directory Window Record 32 shown in FIG. 1.
Figure 4:
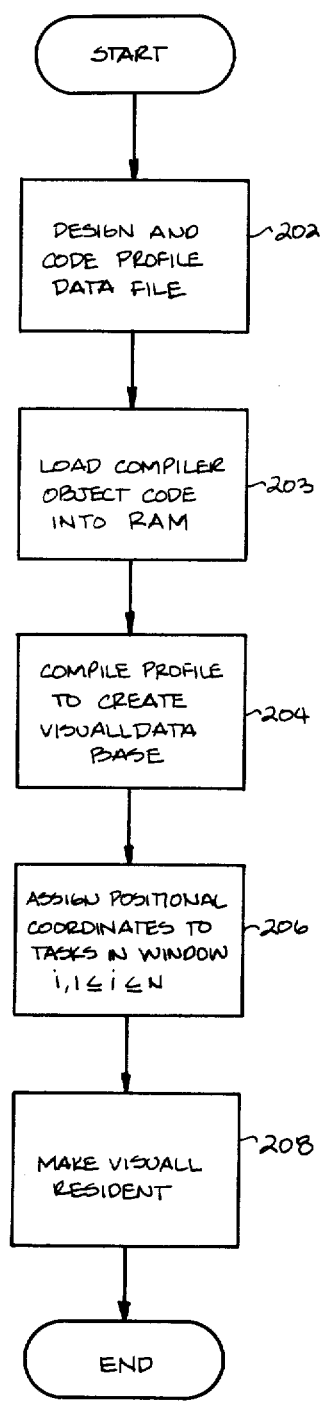
FIG. 4 is a schematic flowchart of an initialization program in accordance with the present invention.

Referring to FIG. 2(D), a directory window record 32 is included for each display window represented in profile database 102. Each directory window record 32 suitably contains a window descriptor field 32a containing indicia of a respective window name, which is used to index (or otherwise provides a link to) a window definition block 34 of task definition records representing a particular display window. Each directory window record would also include an appropriate delimiter 32b (indicating end of record). The use of delimiter fields to indicate end of record is well known in the art. In the preferred embodiment, a link to the associated window definition block 34 is provided through the sequence (order) of the respective directory window records 32 (which are typically stored contiguously in RAM 22), as will be explained.

Referring to FIG. 2(C), at least one accessible task definition record 48 is provided within each of window definition blocks 34. Respective delimiters (not shown) are also suitably provided to demarcate the respective window definition blocks 34. As will be explained, the task definition records 48 are utilized to effect a correspondence between a task name or other indicia to be displayed in the window, positional coodinates within the window (to facilitate designation), and particular actions to be performed (i.e., a task definition) when the task is designated for execution. Each task definition record 48 suitably includes a task descriptor field 48a containing indicia of a task name, "space number" fields 48b and 48c (initially blank) for storing indicia of positional coordinate information (in X and Y cursor position coordinates), and a command string field 48d containing indicia of the actions to be performed when the respective task is designated. The command string stored in field 48a may comprise keystroke characters for communication as such to the operating system (or application program), commands specific to the VisuALL program, or both. Again, an appropriate end of record delimiter 48e would also be included. A respective task definition record 48 corresponding to each task associated with each of the display windows in the profile database 102 would be provided.

Figure 5:
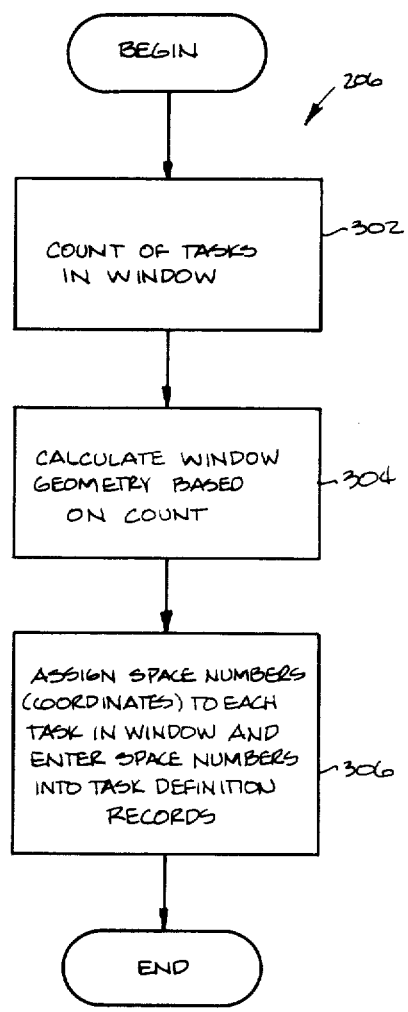
FIG. 5 is a detailed schematic flowchart of the "Assign Coordinates" routine block 206 of the present invention shown in FIG. 4.

As previously noted, after the compiled VisuALL database profile 102 has been generated (step 204), positional coordinates are assigned to each task in the group of tasks associated with each window (step 206). Referring now to FIGURE 5, the assignment of positional coordinates step entails: counting the number of task definition records 48 in each of the window definition blocks 34 (step 302); calculating window geometry (size) based on the number of tasks associated with each window (step 304); and assigning coordinates ("space numbers") to each task definition record 48 based upon window geometry and sequence of the task and entering indicia of the coordinates into the space number coordinate fields 34b and 34c of the task definition record (step 306).

The size of CRT display 18 is typically both fixed and known. For example, CRT display 18 may have a fixed width of 80 characters and a fixed height of 25 lines. Likewise, the length of the task descriptor string (continued in task descriptor field 48a) of each of task definition records 34 is typically constrained to be 18 characters or less (and thus may easily fit onto a single line of CRT display 18. Because of this constraint, the number of tasks in the group associated with a given display window may suitably be determined (step 302) by simply counting the number of task definition records 48 in the window definition block 34 associated with the window (e.g., by counting delimiter fields 48e). An appropriate window geometry is then chosen to accommodate display of indicia (e.g., names or symbols) of the tasks on CRT display 18 (step 304). For example, if indicia of no more than 16 tasks are to be displayed in the window, the task indicia are suitably disclosed in a single column. Similarly, if, for example, from 17 to 32 tasks are associated with the given window, the task indicia are suitably arranged in two vertical columns within the window, with the number of tasks in each column split as evenly as possible. Likewise, if the number of tasks associated with the window is greater than 33 but less than or equal to 48, the task indicia are suitably arranged in three vertical columns, and so forth. Space on CRT display 18 is suitably reserved for display of window designator indicia (such as window name), a "prompt window," and the like.

An "aspect ratio" is then determined: a predetermined unit of window height is accorded for each line of the longest column (i.e., the number of indicia in the longest column); and a predetermined number of units of window width is accorded for each column. The coordinates (column, line) of each task indicia are determined from the column and line in the column wherein the task indicia (name) is disposed, and the positional coordinates (column X, line Y) of the task indicia are stored in fields 48b and 48c respectively of the respective task definition record 48 corresponding to the particular task.

These positional coordinates stored in fields 48b and 48c of each task definition record 48 (suitably termed a "space number") comprise an ordered pair (X, Y) which designates the column and line on CRT display 18 where the first character of the task descriptor string (contained in field 48a) of the associated task definition record 46 will appear when the window which it represents is displayed. For instance, the task descriptor string corresponding to the first task definition record 48 in a window will be displayed in the vicinity of the upper left-hand corner of the screen, and will have, for example, a "space number" of (4, 4). Likewise, a task descriptor string to be displayed halfway down CRT display 18 in the second column will have a "space number" of, for example, (1, 12).

The "space number" stored in fields 48b and 48c of each task definition record 48 is used for two purposes: to specify the position on CRT display 18 where the task descriptor string (stored in field 48a) of the task definition record is to appear when its associated window is displayed; and to index cursor position to one of task definition records 48 of the current window being displayed (so that cursor position in conjunction with, for instance, operation of one of mouse buttons 26a–26d, may be used to cause a command string associated with a selected one of the task definition records 48 to be executed). A particular task can thus be designated by disposing the cursor at a position on CRT display 18 corresponding to the task indicia within a displayed window; the task having positional coordinates equal to the coordinates of the cursor so positioned is thus designated, as will be explained shortly.

As previously noted, all actions under the VisuALL program are initiated by actuation of mouse 26 or keyboard 20. Accordingly, once the profile database 102 has been generated (step 204) and positional coordinates have assigned to each task in the respective windows (step 206), the VisuALL run-time module is made "resident" (step 208). The VisuALL sun-time module detects actuation of mouse 26 or keyboard 20 and, if appropriate, performs tasks associated with the actuation.

As previously mentioned, part of the VisuALL program is executable object code which becomes "resident" in computer system 10. In effect, this executable object code can be regarded as an extension of the Disk Operating System, and will be treated by application programs executing on computer system 10 as part of the operating system.

Referring once again to FIG. 1, the operating system includes an Operating System Keyboard Interrupt Handler 60 comprising a block of executable object code stored somewhere in RAM 22. The operating system "protects" the locations of RAM 22 in which the keyboard interrupt handler 60 is stored to prevent application programs from writing into those locations. As is well known, when a key on keyboard 20 is depressed, a keyboard interrupt typically is generated by computer system 10, causing CPU 12 to cease execution of the task currently being processed and to begin executing object code of keyboard interrupt handler 60. Keyboard interrupt handler 60 may perform a variety of conventional tasks, such as transferring the contents of keyboard buffer 46 to a general purpose register of CPU 12 or to a specified location in RAM 22, displaying the contents of keyboard buffer 46 on CRT display 18, etc.

An executable object code run-time module (suitably called the VisuALL keyboard interrupt routine 62) in accordance with the present invention is added to the operating system keyboard interrupt handler 60 (this code may either be added as a block contiguous in RAM 22 with the operating system keyboard interrupt handler 60, or may be effectively added by merely modifying the operating system keyboard interrupt handler 60 to perform a jump to the location in RAM 22 where the VisuALL keyboard interrupt routine 62 is stored). An IBM disk operating system facility called "interrupt 27" is suitably used to make the VisuALL keyboard interrupt routine 62 an extension of the operating system, thereby causing the operating system to protect the locations of RAM 22 storing the VisuALL keyboard interrupt routine 62 from being accessed by an application program executing on computer system 10.

The VisuALL keyboard interrupt routine 62 may be regarded as effectively inserted in the middle of ("patched into") the operating system keyboard interrupt handler 60. When a keyboard interrupt occurs, control is transferred to the operating system keyboard interrupt handler 60 by the operating system (i.e. object code contained in the keyboard interrupt handler 60 is executed). Because the operating system keyboard interrupt handler 60 has been modified, a jump to the VisuALL keyboard interrupt routine 62 occurs immediately thereafter. The VisuALL keyboard interrupt routine 62 may perform tasks itself, or may determine that it has not been called upon to perform a task. Once the VisuALL keyboard interrupt handler 62 has performed a particular task in response to the input which caused the keyboard interrupt (the task performed may comprise merely determining that no task is to be performed), the VisuAll keyboard interrupt routine may then transfer control back to the operating system keyboard interrupt handler 60 (typically by performing a jump, as is well known).

As will become apparent, there are instances in which the VisuALL program, once invoked, itself requests an input response from the user (such as a response to a PROMPT, SPROMPT or FPROMPT command). If desired, a task scheduler facility of the operating system may be utilized to suspend the execution of any application program executing when the VisuALL keyboard interrupt routine 62 was invoked to make the system more reliable. For instance, a task scheduler would prevent application program from "over-writing" windows displayed by the VisuALL program on CRT display 18.

Referring to FIGS. 3 and 6, when a key on keyboard 20 is depressed or keyboard type mouse (e.g., LogiTech) is being utilized and is activated, a keyboard interrupt flag 72 is set by the VisuALL keyboard interrupt routine 62 to indicate to the operating system that the keyboard interrupt was being serviced (step 402). Thereafter, it is determined whether the interrupt was generated by actuation of keyboard 20 or mouse 26 (step 204). If a serial mouse 26 is being utilized, flag setting step 402 is effected only in response to depression of keyboard keys and the input interrupt caused by a actuation of the mouse is handled by a VisuALL mouse interrupt handler 64, as will be explained.

As mentioned previously, there are, in general, three types of mice: a keyboard-type "mouse" (e.g., the LogiTech mouse), a parallel type mouse (such as the Microsoft mouse), and a serial-type mouse (such as Mouse Systems mouse). Keyboard-type mice may be connected directly in parallel with keyboard 20, and generate an output which is indistinguishable from that of the keyboard. Thus, inputs generated by either keyboard 20 or a keyboard-type mouse 26 may be handled in precisely the same manner by the VisuALL keyboard interrupt routine 62. However, inputs from parallel-type and Serial-Type mice must be handled differently. For instance, the inputs generated by Serial-Type mice are typically transmitted to computer system 10 through an asynchronous serial communications port. The output which serial- and parallel-type mice generate will not, in general, be similar to the output format generated by keyboard 20. For example, a conventional serial-type mouse may produce an output string comprising several bytes including a "header," a series of bytes indicating the one (if any) of mouse buttons 26a-26d which has been depressed, and displacement information (comprising a byte of information for each of the up/down and left/right directions of mouse movement) which specifies how far the mouse has been moved since the last time its position was output to computer system 10.

Since the VisuALL program communicates with computer system 10 principally through operating system keyboard buffer 46, it must translate the output which it receives from a serial-type mouse 26 into a format which may be accepted by the keyboard buffer 46. Additionally, for efficiency reasons, it is desirable that the VisuALL program process the outputs from keyboardtype mice, parallel-type mice and serial-type mice in substantially the same way. For this reason, the VisuALL program includes a second block of executable run-time object code called the mouse interrupt handler 64. Mouse Interrupt Handler block 64, like the VisuALL keyboard interrupt routine 62, is made "resident" (step 208) (and thus may be regarded as an extension of the operation system).

When one of mouse buttons 26a-26d of a serial-type or parallel-type mouse 26 is depressed (or alternatively, when a serial-type or parallel-type mouse 26 is moved), a mouse input interrupt is generated, as is well known. The VisuALL compilation step 204 initializes the Operating System (in accordance with the COMM and INTERRUPT commands discussed previously) to specify a particular serial input port of computer system 10 and a particular interrupt line for invoking this mouse input interrupt. Once initialized, the operating sytem will, upon receiving an input interrupt from serial-type or parallel-type mouse 26, transfer control to mouse interrupt handler 64. The function of the mouse interrupt handler 64, as mentioned above, is merely to convert the data received from the mouse 26 into a format similar to what would have been received from a keyboard-type mouse. This conversion process is conventional and well known in the art. It should be noted that the particular operations effected by mouse interrupt handler 64 will depend upon the particular type of mouse being utilized (as specified by the MOUSE command discussed previously). Once mouse interrupt handler 64 has converted the data received from the mouse to an appropriate format (step 401), it transfers control to a location in the VisuALL keyboard interrupt routine 62 so that the data may be interpreted and appropriate tasks performed.

The data received from mouse 26 or keyboard 20 is stored in temporary keyboard buffer 38 (step 403). If the interrupt is generated from mouse 26, the function assigned to the mouse action (i.e., defined in the corresponding one of mouse function records 30) is executed (step 406). The execution of the mouse function will hereinafter be more fully described in conjunction with FIG. 7.

If the interrupt is generated from the keyboard 20, it is determined whether the depressed key is assigned to a mouse function (step 408). This determination is performed by comparing the input character received (and stored in temporary keyboard buffer 38 by step 403) with entries in a lookup table (not shown) contained in RAM 22. This lookup table typically comprises eight entries, one for each possible assignment of a key of keyboard 20 to the function of one of mouse buttons 26a-26d and one of mouse movements (left, right, up, down). This lookup table is initialized in accordance with the KEYBOARD command discussed previously. If a mouse function is assigned to the particular key depressed, the execute mouse function (step 406) is effected. If the key is not assigned to a mouse function, a determination is made as to whether or not the keystroke is part of a prompt response (step 410) (typically by polling a prompt flag 70, as will be explained). If the prompt flag 70 is set (indicating that a prompt response is being collected), then the character is tested to determine if it is the end of the prompt response (typically indicated by an ENTER character) (step 411). If not, then the character is stored in a user response buffer 36 (step 412). If the character is the end of the user response, prompt flag 70 is reset (and a delimiter is inserted in user response buffer 38) (step 413). In the event that the keyboard entry is not part of a prompt response, the VisuALL programs is, in effect, bypassed, the character is communicated to the operating system keyboard buffer 46 (step 414), and control is returned to the operating system keyboard interrupt handler 60.

The contents of the temporary keyboard buffer 38 are communicated to the operating system keyboard buffer 46 serially, one byte at a time. Typically, operating system keyboard buffer 46 has a fixed, limited length (e.g. 15 bytes); only a limited length is necessary because of the limited rate at which a user is capable of entering data through keyboard 20. However, the VisuALL program may wish to transfer a string of keystrokes having a length in excess of the capacity of operating system keyboard buffer 46 (the temporary keyboard buffer 38 may be of any desired length). Typically, keystrokes are communicated from temporary keyboard buffer 38 to operating system keyboard buffer 46 at a fixed rate (such as 18 characters per second) and will be communicated only if there is space for them in the operating system keyboard buffer.

Referring now to FIG. 7, the execute mouse function step (step 406) will be described. When a mouse action (depression of button or movement) is detected, and a mouse function is to be executed, it is determined which of the buttons or movements caused the interrupt (merely by decoding the contents of temporary keyboard buffer 38) is performed. Based on this determination, an address associated with the one of mouse function records 30 corresponding to the actuated button or movement is loaded into a mouse function recorded address pointer 76 (step 501). It is then determined whether the action is a depression of one of mouse buttons 26a-26d, or a movement of the mouse (step 502). If one of mouse buttons 26a-26d was depressed, the task defined by the mouse function record 30 corresponding to that button is performed (steps 503 and 504). The "perform prompt and response scan cycles" step 503 and the "perform mouse function string" step 504 will hereinafter be more fully described in conjunction with FIGS. 8(A)–8(B).

If the mouse action is a movement (typically to effect movement of the cursor), a determination is made whether any window is presently being displayed (step 506) (typically by polling a window display flag 74). If the current window is not presently displayed, the function string contained in the mouse function record 30 associated with the particular movement is performed (step 504). If a window is presently displayed, the cursor is moved on CRT display 18 in accordance with the movement via "direct addressing" (regardless of the definition given by the CURSOR command to the various mouse movements).

There are typically two ways in which the VisuALL program may move the position of the cursor on CRT display screen 18: via the application program, and via direct addressing. Provided that the application program (or the operating sytem) is responsive to the leftarrow, rightarrow, uparrow and downarrow keys of keyboard 20, depression of one of those keys will cause the cursor to move in an appropriate direction (for instance, when a user depresses the uparrow key, the cursor will move one line upwards on CRT display 18). The VisuALL program may make use of this feature to move the cursor by merely loading into keyboard buffer 46 an appropriate number of rightarrow, uparrow, downarrow or leftarrow characters (corresponding to the displacement and direction of desired cursor movement). If a window is not currently being displayed by the VisuALL program (and the FLY command is not invoked), movement of mouse 26 will result in loading keyboard buffer 46 with these conventional cursor control characters, so that the mouse may be used in lieu of the uparrow, downarrow, rightarrow and leftarrow keys of keyboard 20 to control cursor position.

The "direct addressing" method of controlling cursor position operates in a different manner. The operating system typically provides a special utility interrupt function which may be used to directly control cursor position. The VisuALL program may call this utility function and pass it parameters (typically X and Y coordinate values) specifying the location on CRT display 18 to which the cursor is to be moved. Because keyboard buffer 46 is not used to transit this information, the application program is not informed that the cursor has been moved (thus, operations performed by the application program dependent upon cursor movement will not be affected). Before moving the cursor using the "direct addressing" mode, the VisuALL program may submit a request to the operating system (using another utility function) and receive from the operating system the current cursor position. This current cursor position is saved in a current cursor position record 45 before the cursor is moved. When the VisuALL program is to relinquish direct control of the cursor (e.g., when the display of the current window is terminated), the contents of the current cursor position record 45 are sent to the operating system (via the cursor control utility function described above) to restore the position of the cursor to what it was before it was moved by the VisuALL program.

Direct addressing of the cursor is used to move the cursor whenever the application program is to remain unaffected by the cursor movement. For instance, when the current window is being displayed, the cursor is moved via direct addressing by step 508. Likewise, the FLY command (discussed previously) causes the cursor to be moved by direct addressing rather than by sending arrowkey characters to keyboard buffer 46.

Figure 8A:
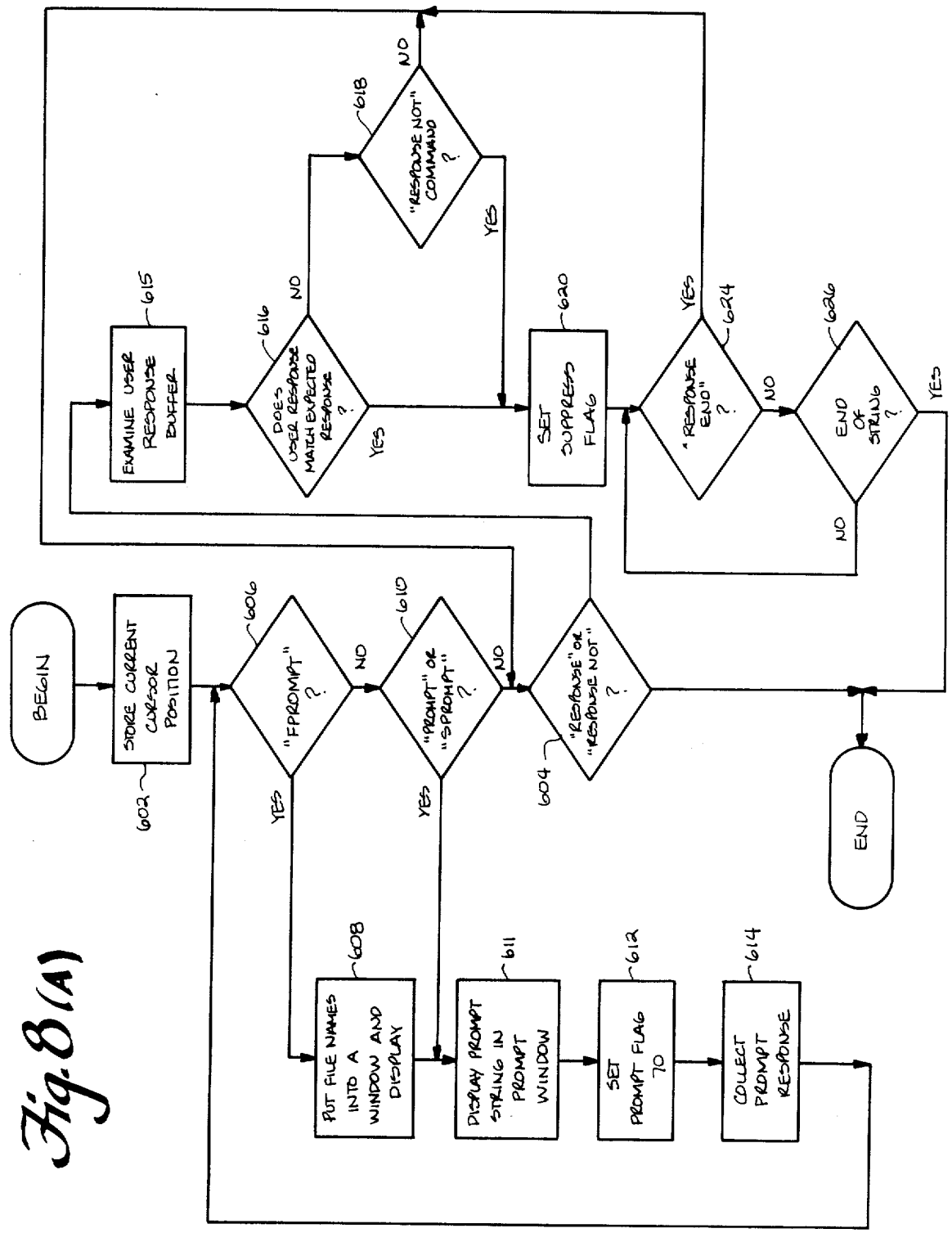
FIG. 8(A) is a detailed schematic flowchart of the "Perform Prompt And Response Scan Cycles" block 503 of FIG. 7 and 1112 of FIG. 10.
Figure 8B:
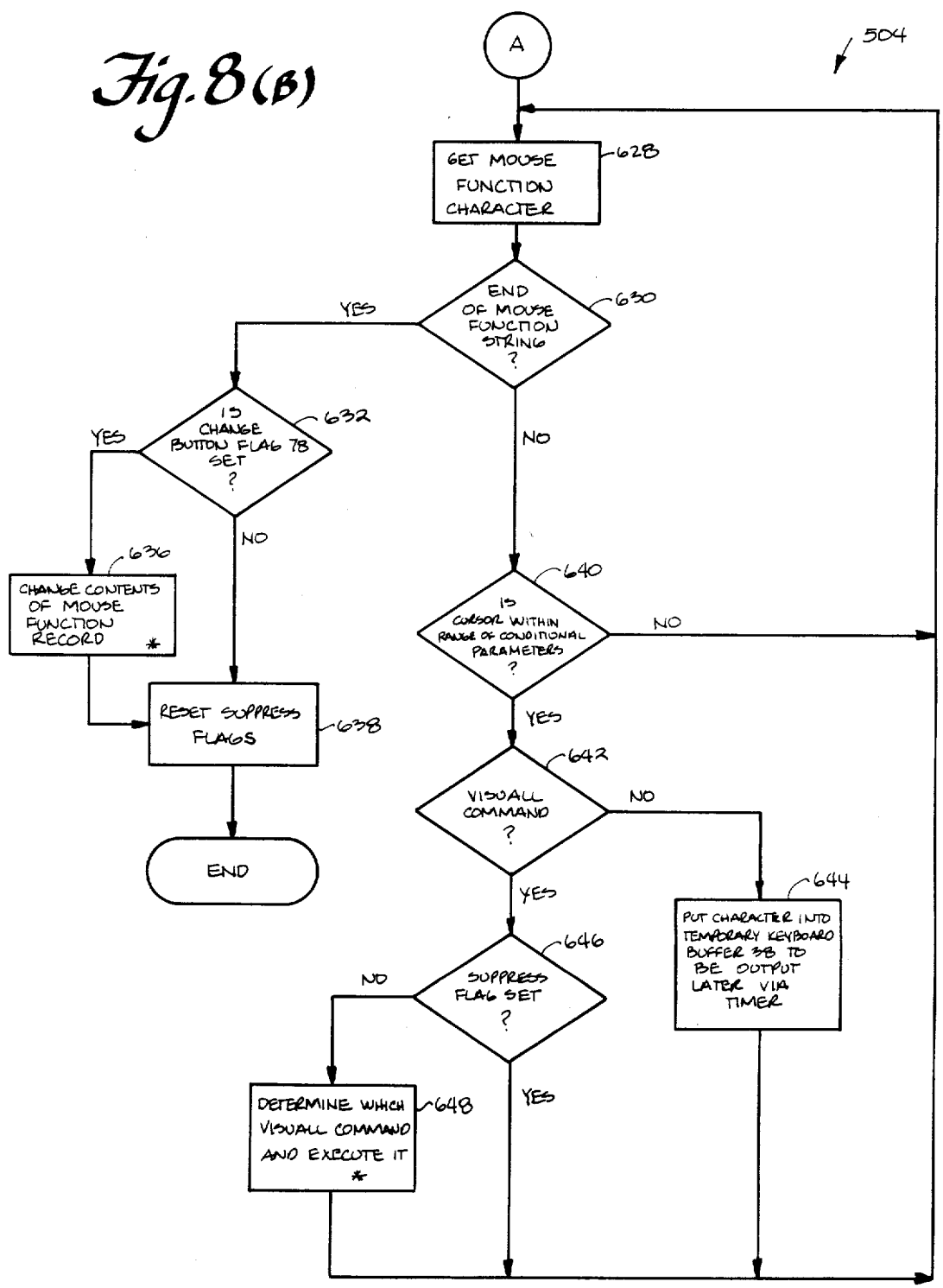
FIG. 8(B) is a detailed schematic flowchart of the "Perform Mouse Function String" block 504 shown in FIG. 7.

Referring now to FIGS. 8(A)–8(B), the perform prompt and response scan cycles block and the perform mouse function string block (steps 503 and 504 of FIG. 5) will now be described in greater detail. The current cursor position is initially noted and stored in current cursor position record 45 of RAM 22 (step 602), as described above. The appropriate one of mouse function records 30 (corresponding to the mouse button depressed or mouse movement) is then accessed, typically byte-by-byte. As will be recalled, the starting address (in RAM 22) of the function string field 30b of the mouse function record was stored in a Mouse Function record address pointer 76 by step 501. Mouse function record address pointer 76 is incremented to address each of the respective codes contained in the appropriate one of mouse function records 30.

The appropriate one of mouse function records 30 is "scanned" in three cycles: a PROMPT cycle; a RESPONSE scan cycle; and an "execute" cycle. The former two cycles are performed by step 503 and shown in FIG. 8(A), while the "execute" cycle is performed by step 504 and shown in FIG. 8(B).

The PROMPT scan cycle collects all user responses required by the function string field 30b and stores them into user response buffer 36. Mouse function record address pointer 76 is incremented (byte location by byte location) through function string field 30b to detect if the function string field contains the code for a FPROMPT, PROMPT or SPROMPT VisuALL command.

As mentioned previously, function string field 30b of mouse function records 30 contains ACSII codes indicative of VisuALL commands to be executed by the VisuALL program and/or keystrokes to be transmitted to the application program. Keystrokes to be transmitted to the application program will be stored in function string 30b in their normal ASCII representation. Each VisuALL command, on the other hand, will be stored as a single "extended" ASCII code of the value $80_{HEX}$ or above. Thus, for instance, the RESPONSE command might be represented by the value 95, the PROMPT command might be represented by the value 94, etc. Conventional decoding techniques are used to determine the VisuALL command or keystrokes represented by each code.

If the 8-bit code from function string field 30b being examined corresponds to the FPROMPT VisuALL command, then a window containing the names of all of the files accessible via disk drive 16 is displayed on CRT display 18 (step 608). The various file names may be obtained in a conventional manner by requesting the operating system to obtain a directory of the files accessible via disk drive 16 (using an operating system utility command), storing those file names in a buffer (not shown) in RAM 22, reformatting the file names to conform them with the VisuALL program window geometry and format (similar to the steps performed by the process shown in FIG. 5) and displaying the newly-formed window on CRT display 18. Alternatively, the executable VisuALL interrupt routine 62 may include a section of code which directly scans mass storage via disk drive 16 to determine the names of the files stored thereon.

If the 8-bit code being examined is not an FPROMPT command, then it is tested to determine if it is either a PROMPT or a SPROMPT command (both of which require that the user provide a response to the VisuALL program, as does the FPROMPT command) (step 610). If the 8-bit code is either a PROMPT, SPROMPT or FPROMPT command, a prompt message is displayed in the "prompt window" portion of the current window on CRT display 18 (step 611). The method of displaying a predetermined character string at a predetermined position on CRT display 18 is, of course, well known. The prompt message to be displayed is typically stored in function string field 30b sequentially after the code corresponding to a PROMPT, SPROMPT or FPROMPT command, and is followed by a delimiter.

The user response to the prompt is collected from the window or the keyboard 20 (step 612) and stored in a user response buffer 36 (step 614). As previously mentioned, the user may input his or her response by either moving the cursor to indicia displayed as part of the displayed window (such as in the case of the FPROMPT command) and depressing an appropriate one of mouse buttons 26a–26d, or alternatively, by typing the response in through keyboard 20. Once the entire response is collected, a jump back to step 606 occurs to scan the remainder of function string 30b for PROMPT, SPROMPT and FPROMPT commands.

Once steps 606–614 have scanned the entire function string field 30b of the appropriate one of mouse function records 30 (as indicated conventionally by a delimiter at the end of the function string field), the RESPONSE scan cycle begins. Mouse function record address pointer 76 is reset to the beginning of function string field 30b, and the function string field is scanned (byte by byte) for the code corresponding to a RESPONSE or a RESPONSE NOT command. As discussed previously, the RESPONSE and RESPONSE NOT commands provide for conditional execution of VisuALL commands (and/or conditional transmittal of keystrokes to the application program) dependent upon whether the user response to a preceeding SPROMPT command corresponds to the expected response (as defined by the parenthetical argument to the RESPONSE command in the source code profile data file). As stored in function string field 30b, a RESPONSE command typically comprises an 8-bit code corresponding to the RESPONSE command itself, a string of ASCII characters specifying the expected user response on which the conditional execution is to be based, and a "suppress" flag (which is normally set to logic zero). Following the suppress flag are the codes for VisuALL commands to be conditionally executed.

If a RESPONSE command is found (step 604), the first user response to a SPROMPT command stored in the user response buffer 36 is compared with the expected response (stored in the function string field 30b (steps 615, 616). (Typically, user response buffer 46 contains additional information designating the type of "prompt" command to which each of the responses which it contains correspond.) If the user response matches the expected response, the suppress flag within function string field 30b is set (e.g. to logic 1) (step 620). If the user response does not match the expected response, but the RESPONSE command located by step 604 was actually a RESPONSE NOT command (indicated by a different 8-bit code), then the suppress flag is also set (step 620). The function string field 30b is then scanned until the next RESPONSE command is encountered (or delimiter is encountered) (step 624), indicating that the remainder of the function string field is to be executed without being conditioned on the result of the comparison associated with the previous RESPONSE command. If a delimiter is encountered, then step 604 scans the remainder of function string field 30b for other RESPONSE commands. If a delimiter indicating the end of function string field 30b is reached (step 626), then the RESPONSE scanning cycle is completed and the "execute" cycle may begin.

Once the PROMPT, SPROMPT and FPROMPT commands and the RESPONSE command have been appropriately processed (by steps 604–626), the function string field 30b of the appropriate one of mouse function records 30 is scanned once again from beginning to end, this time to actually perform the tasks which it contains. Function string field 30b is accessed one character at a time (step 628) as before, and the VisuALL commands which it contains are executed (or the keystrokes which it contains are transmitted to the application program) in the order in which they appear in the field. Execution (communication) may be conditional, however, on both the state of any "suppress" flags (corresponding to RESPONSE commands), and in the case of IF or IF NOT commands, on whether the cursor is within the range of conditional parameters established by fields 30c and 30d of the mouse function record 30.

As previously described, the commands IF and IF NOT may be used to cause the function associated with one of mouse buttons 26a–26d or mouse movements to be conditioned on the present position of the cursor. Ranges of cursor positions are stored in fields 30c and 30d (for columns and lines, respectively). Special codes may be stored in fields 30c and 30d to indicate that the tasks described in function string field 30b are to be performed regardless of the position of the cursor (in which case step 640 will always produce a "yes" result). Otherwise, the IF and IF NOT commands will cause the present cursor position (obtained from the operating system as previously described) to be compared with the range of value stored in fields 30c and 30d (suitably comprising a column position, a column offset, a line position and a line offset, respectively), and the tasks contained in function string field 30b will be performed only if the cursor is within the specified range.

The code removed from the function string field 30b is tested to determined if it is a VisuALL command (by merely testing its most significant bit, as previously described (step 642). If the character is not a VisuALL command, then it must be a keystroke to be communicated directly to the application program; in this case, the character is placed into temporary keyboard buffer 38 (unconditionally) to be transferred to the operating system keyboard buffer 46 at a later time (step 644). If the character is a VisuALL command, then any "suppress" flags associated with that command are tested to determine whether or not they are set (block 646). If such a suppress flag is not set, then the character is decoded to determine which VisuALL command it is, and executed (as will be more fully described in connection with FIG. 9) (step 648). If the suppress flag is set, the VisuALL command is not executed and the next character is obtained from function string field 30d (step 628).

Characters are continually retrieved from function string field 30b until there are no more characters remaining (as indicated by a delimiter). At this time, it is determined whether the function of a mouse button or movement is to be changed by testing a change button flag 78 (to be discussed in conjunction with FIG. 9) (step 632). If so, then the change specified will be effected by changing the contents of the appropriate mouse function records 30 to reflect the changed function (step 636). Step 636 will be described in greater detail in connection with FIG. 14. Whether or not the mouse function record is to be changed, all of the suppress flags in field 30b are reset (step 638).

Figure 9:
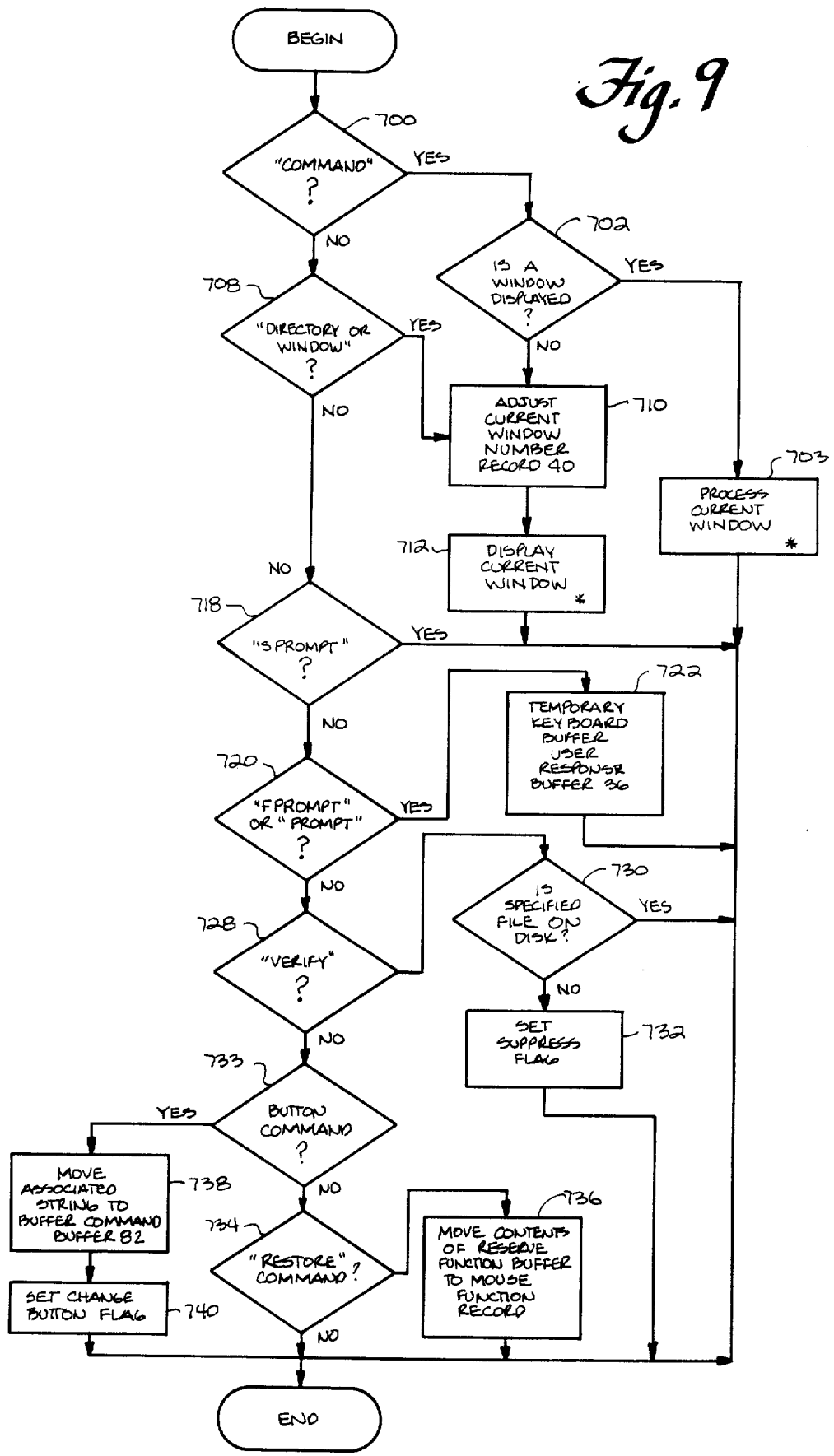
FIG. 9 is a detailed schematic flowchart of "Determine VisuALL Command and Execute" block 648 shown in FIG. 8(B) and block shown in FIG. 13.
Figure 13:
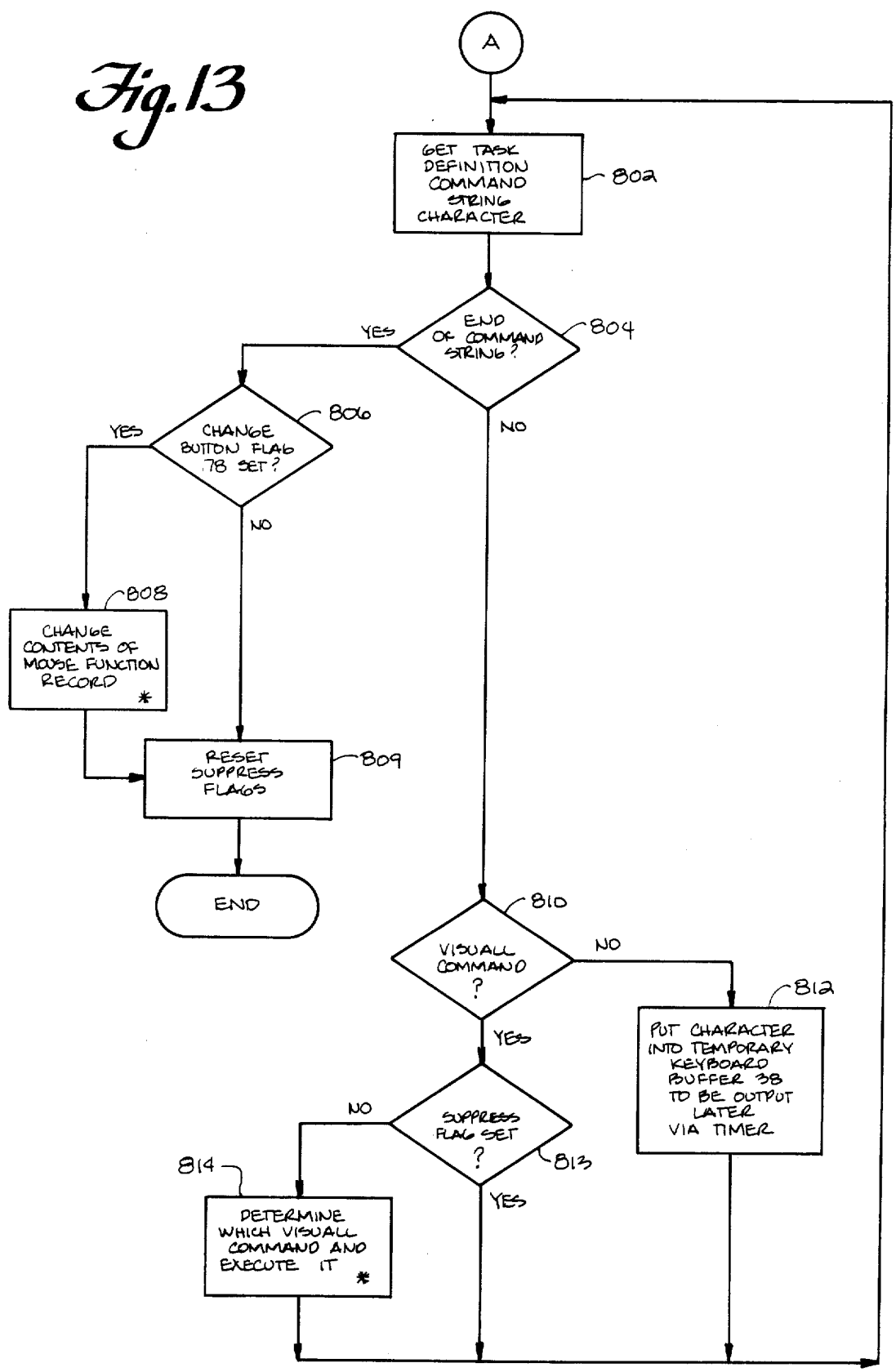
FIG. 13 is a detailed schematic flowchart of "Execute Window Commands" block 704 shown in FIG. 10.

Referring to FIG. 9, shown is a detailed flow chart of the "determine which VisuALL command and execute it" step 648 shown in FIG. 8(b) and step 814 shown in FIG. 13. Steps 700-740 shown in FIG. 9 determine which VisuALL command is to be executed and to perform the task associated with that command. The command code derived from mouse function string 30b is first tested to determine if it corresponds to the COMMAND command (step 700). If it does, then it is determined whether the current window is presently being displayed (typically by polling window display flag 74) (step 702). If the current window is presently being displayed, then the current window is processed (step 703), as will be more fully described in connection with FIG. 13.

If a window is not presently being displayed, the COMMAND command will cause the current window to be displayed. To display the current window, the current window pointer 40 may have to be adjusted (step 710) (as will be described). Once the current window number record 40 has been adjusted, the current window is displayed (step 712) (to be described more fully in connection with FIG. 11).

The current window number record 40 will at all times addresses the one of window definition blocks 34 in RAM 22 which corresponds to the current window to be displayed. The default value of the current window number record 40 typically is the number of the one of window definition blocks 34 corresponding to the source code which appears first in the source code profile data file (and thus typically corresponds to the first one of window definition blocks 34 stored in structured profile database 102 in RAM 22). Of course, as mentioned previously, the user may select different windows to be displayed by executing task definition statements (or mouse functions) containing the WINDOW command. The effect of the WINDOW command is to adjust the current window number record 40 to address a different one of window definition blocks 34, as will be explained.

If the command to be performed is not the COMMAND command, then the code representing the VisuALL command to be executed is tested to see if it represents the DIRECTORY command or the WINDOW command (step 708). If the command is a DIRECTORY command, then current window number record 40 is adjusted to address the directory window records 32 (which themselves comprise a window to be displayed) (step 710), and the resulting directory window is displayed (step 712). If the command is a WINDOW command, then the current window number record 40 is adjusted to address the one of window definition blocks 34 referenced by the parenthetical argument to the WINDOW command (typically stored in the string after the WINDOW command) and to display the indicia associated with that window.

When the WINDOW command is executed by the VisuALL program, directory window records 32 are searched linearly to find the parenthetical argument of WINDOW (which corresponds to the designation indicia of the selected window to be displayed). As the directory window records 32 are searched, they are also counted (by incrementing a counter storage location in RAM 22, not shown). When the designation indicia of the selected window is found in directory window records 32, the maintained count will reflect the position (order) of the corresponding directory window record 32 in the directory window records. This count may then be used directly to index the one of window definition blocks 34 corresponding to the selected designation indicia (since the directory window records 32 are stored in the same order that window definition blocks 34 are stored in profile database 102. By merely counting delimiters 84 between the window definition blocks 34, the VisuALL program may locate the one of window definition blocks 34 representing the selected window.

If the code does not represent any of the VisuALL commands discussed above, it is tested to see if it corresponds to the SPROMPT command (step 718). If it does, then no further processing is required.

If the code does not represent the SPROMPT command, then it is tested to determine if it represents either the FPROMPT or the PROMPT command (step 720). If it does, then the contents of the user response buffer 36 corresponding to that particular FPROMPT or PROMPT command are loaded into the temporary keyboard buffer 38 (to be eventually transmitted to the application program) (step 722).

If the code does not correspond to the above commands, then it is tested to see if it represents the VERIFY command (step 728). If it does, then the string argument associated with the code is typically sent as a parameter to an operating system utility function which will determine whether a file by that name is stored on mass storage via disk drive 16 (step 730). If there is no such file by that designation accessible by disk drive 16, a suppress flag associated with the VisuALL commands following the VERIFY command will be set, thus inhibiting the execution of these commands (when they in turn are examined by step 646) (step 732). Otherwise, no action is taken.

If the code does not correspond to the VERIFY command, then it is tested to determine if it corresponds to the BUTTON command (step 733). If it does, then the string associated with this code (typically stored sequentially after the code and delimited by a delimiter) is stored in a BUTTON command buffer 82 (step 738) and the change button flag 78 is set (step 740).

If the code does not correspond to the BUTTON command, then it is tested to determine if it corresponds to the RESTORE command (step 734). If it does, then the appropriate one of mouse function records 30 is restored to what it was before it was last changed (performed by loading the contents of the appropriate one of mouse function records 30 with the contents of its associated button reserve function string record 80) (step 736). The reserve function string records 80 and their contents will be discussed more fully in connection with FIG. 14.

Figure 10:
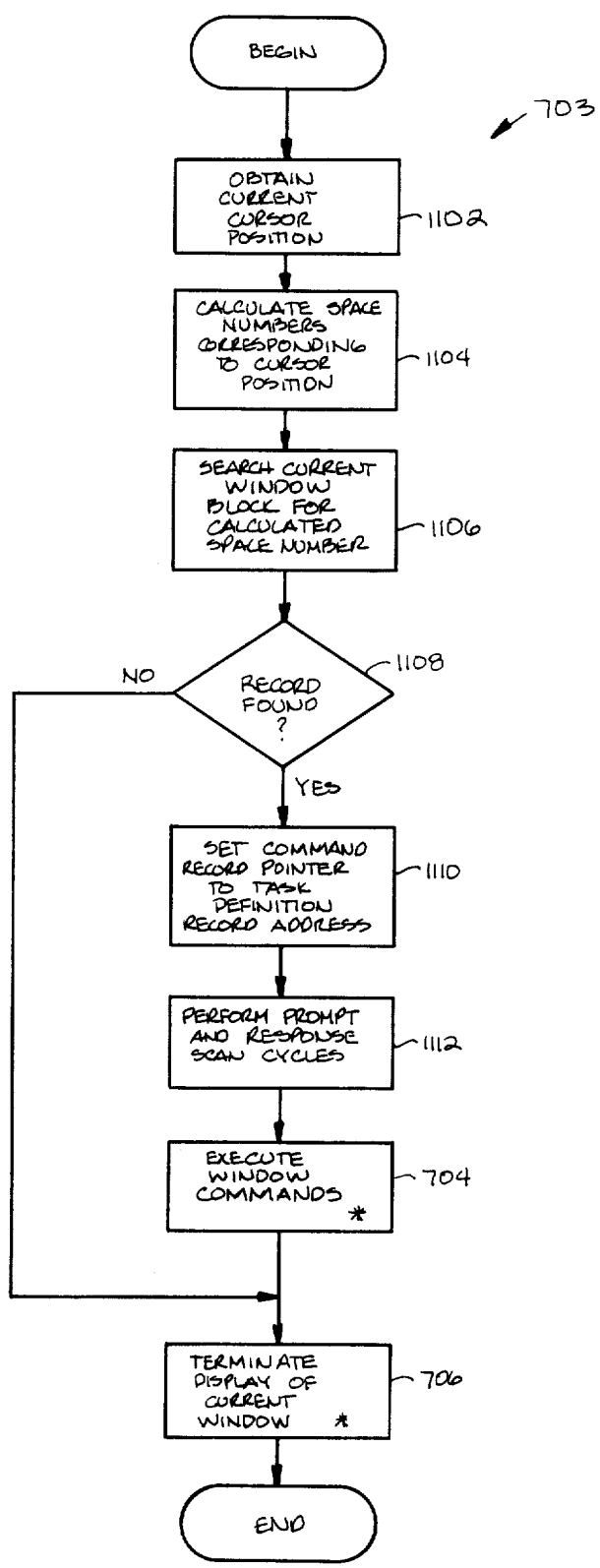
FIG. 10 is a detailed schematic flowchart of the "Process Current Window" block 703 shown in FIG. 9.

Referring to FIG. 10, a detailed flow diagram of the Process Current Window step 703 of FIG. 9 is shown. The function of this step is to execute a task specified by the one of task definition records 48 associated with a designator indicia to which the cursor is pointing when the appropriate one of mouse buttons 26a-26d is depressed.

It will be recalled that step 703 of FIG. 9 is performed only when the window associated with the one of window definition blocks 34 which is pointed to by current window number record 40 is being displayed. Step 703 "processes" the current window being displayed by permitting the user to select one of the tasks associated with that window, executing the selected task, and terminating the display of the window. The current cursor position is obtained (step 1102, typically by utilizing an operating system utility function, as described previously) and a "space number" corresponding to the current cursor position is calculated (step 1104). This space number calculation is easily performed by simply converting the information supplied by the operating system into the row and column format discussed previously. A linear seach of each of task definition records 48 contained by the window definition block 34 corresponding to the current window is then performed to determine which of the task definition records is associated with the current cursor position (step 1106). This linear search is typically performed by merely comparing the space numbers corresponding to the current cursor position (as produced by step 1104) with the space numbers contained in fields 48b and 48c of each of the task definition records 48 in the current window definition block 34 until a match is obtained. If no task definition record 48 in the current window definition block 34 contains space numbers corresponding to the current cursor position (as determined by step 1108), then the display of the current window is terminated (step 706).

If one of task definition records 48 does, however, contain space numbers corresponding to the current cursor position, then a command record pointer 46 is loaded with the beginning addressed of the command string field 48d of the selected task definition record (step 1110). The task or tasks specified by the command string field 48d addresses by the command record pointer 46 is then performed (steps 1112 and 704), and the display of the current window is terminated (step 706). The operation of steps 704 and 706 will be explained in greater detail in conjunction with FIGS. 13 and 12, respectively.

The operation of step 1112 is virtually identical to that of step 503, and thus has already been explained in great detail in conjunction with FIG. 8(A). Of course, the algorithm of step 1112 operates on the command string field 48d addressed by the command record pointer 46 (rather than on a mouse function string field 30b addressed by the mouse function record address pointer 76, as was previously described). However, the algorithm employed is the same for either task definition records or mouse function records.

Referring to FIG. 13, shown is a detailed flow diagram of the "execute window commands" step 704 of FIG. 10. It will be noted that FIG. 13 is quite similar to FIG. 8(B). In fact, the principal difference between the algorithm performed by step 704 and the algorithm performed by step 504 is that IF and IF NOT commands are not processed (because the position of the cursor must already be positioned such as to select the task definition command string being peformed).

Figure 11:
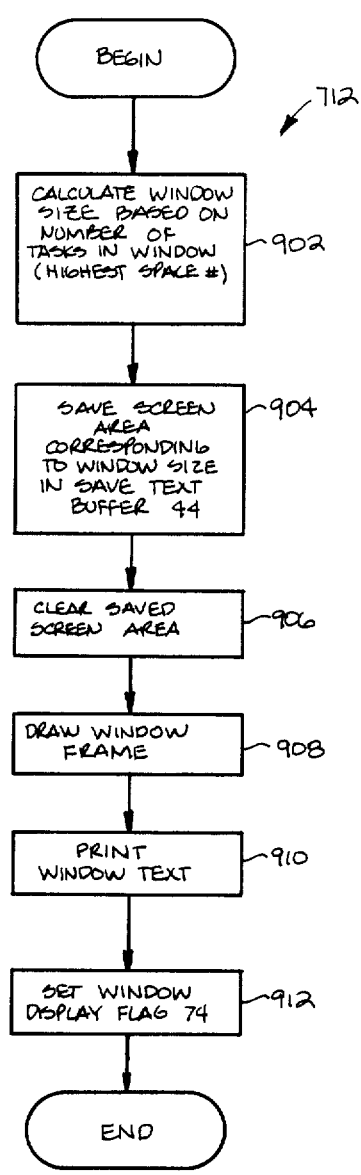
FIG. 11 is a detailed schematic flowchart of the "Display Current Window" block 706 shown in FIG. 9.

Referring to FIG. 11, shown is a flow diagram of the display current window step 712 of FIG. 9. To display the current window, the aspect ratio of the window must first be calculated, as previously described (step 902). Once the aspect ratio is known, it can be directly determined which areas of CRT display screen 18 will be overwritten by the display of the current window. The information displayed in the areas to be overwritten (typically text produced by the application program) is preserved for later display by storing it in a save text buffer 44 (step 904). The area to be overwritten is then cleared (step 906). The dimensions of the window frame for the current window are calculated based upon the number of task definitions in the current window, and the window frame (or border) is "painted" on CRT display screen 18 (step 908). It should be noted that the window frame for the display of every window in profile 102 has its upper left-hand corner located at the same point on CRT display screen 18 (e.g. column 0, line 0) so that the dimensions of the window frame may be arithmetically calculated from the number of task designation indicia to be displayed. The area within the window frame may be "painted" white (using "inverse video") if desired. Likewise, a variety of techniques (such as the use of borders, headers, and a shaded background) may be used to create an aesthetically pleasing effect.

Once the window frame of the current window is drawn, the contents of the task descriptor fields 48a of each of the task definition records 48 of the current window definition block 34 are displayed in appropriate positions within the window frame (as defined by the space numbers contained in fields 48b and 48c of the respective task definitions records) (step 910). Finally, the window display flag 74 is set (step 912).

Figure 12:
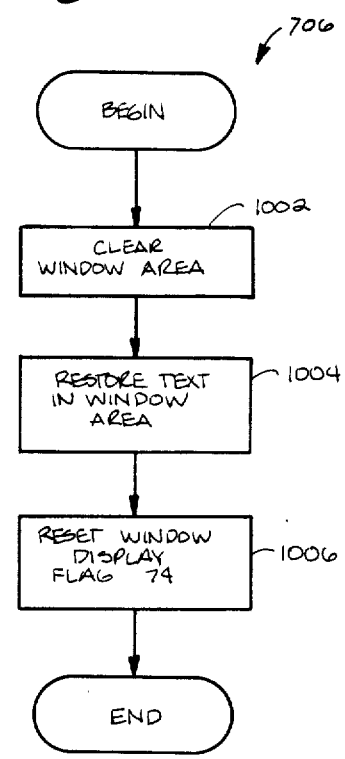
FIG. 12 is a detailed schematic flowchart of the "Terminate Current Window" block shown in FIG. 10.

Referring to FIG. 12, shown is a detailed flow diagram of the terminate display of window step 706 shown in FIG. 10. The terminate display of window step 706 typically performs the reverse function of the display current window step 712. The area in which the current window is being displayed is cleared (step 1002), and the previous information displayed there is removed from the save text buffer 44 and restored to the refresh memory for the CRT display 18 (step 1004). The window display Flag 74 is then reset (step 1006).

Figure 14:
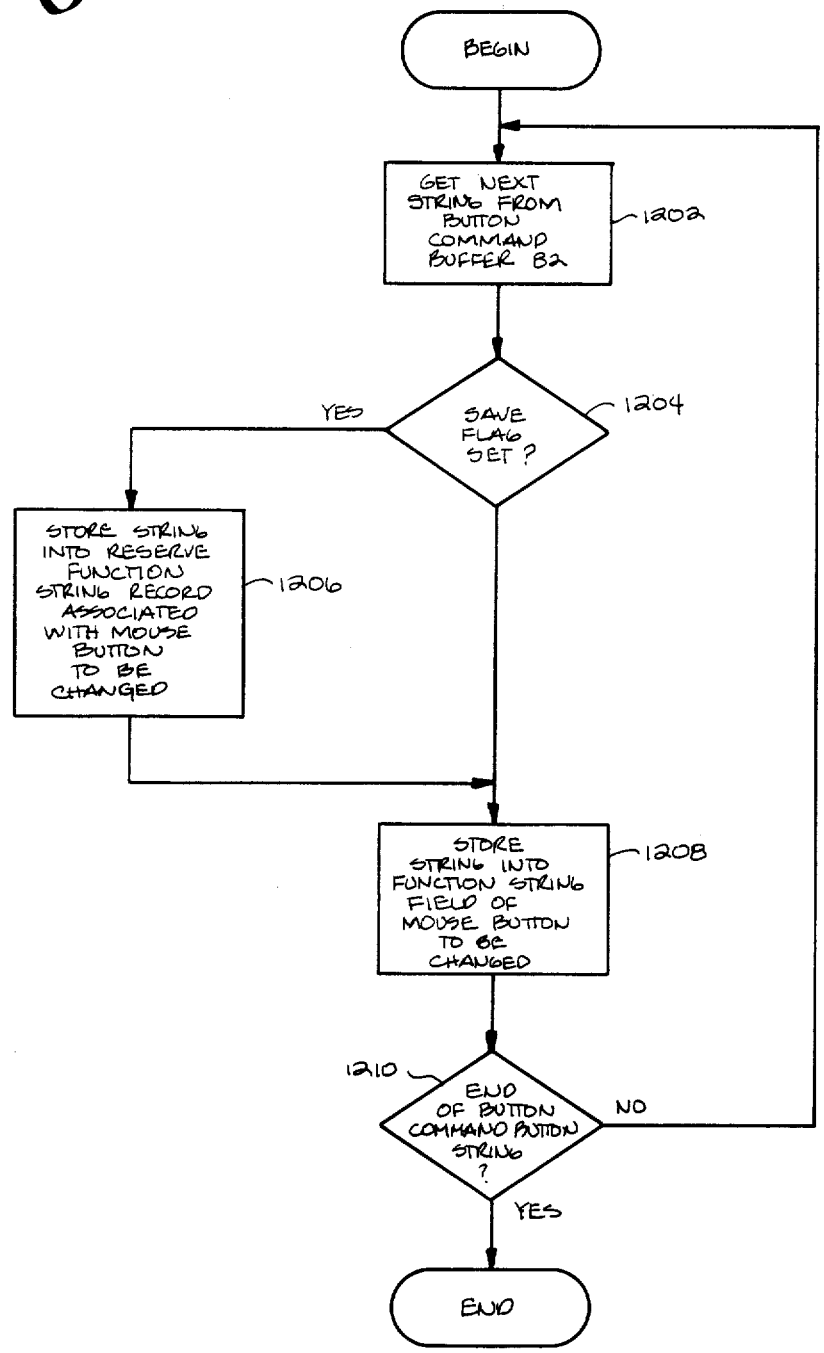
FIG. 14 is a detailed schematic flowchart of "Change Contents of Mouse Function Record" block 636 of FIG. 8(B) and block 808 of FIG. 13.

Referring to FIG. 14, shown is a detailed flow diagram of the "change contents of mouse function record" step 636 of FIG. 8(B) and step 808 of FIG. 13. Steps 1202-1210 of FIG. 14 change the contents of the function string field 30b of one or more of mouse function records 30 in response to a BUTTON or RESTORE command. As previously described, a button command buffer 82 was loaded with strings corresponding to the VisuALL commands and/or keystrokes to be communicated to the application program in response to a BUTTON command by step 73b of FIG. 9. A BUTTON command anywhere appearing within a function string field 30b of a mouse function record 30 or a command string field 48d of a task definition record 48 will be effected only after all of the tasks invoked by the record have been performed (since the BUTTON command reconfigures the function of one of mouse buttons 26a-26d in preparation for the next depression of the button). BUTTON commands may be nested one inside another, as previously described. As stored in the function string field 30b of a mouse function record 30 (or a command string field 48d of a task definition record 48), each BUTTON command code has associated with it a save flag (normally not set). Compilation step 204 of FIG. 5 sets the save flag associated with the first ("outer") of multiple nested BUTTON commands. If the save flag associated with a given BUTTON command code stored in button command buffer 82 is set (as determined by step 1204), then all of the codes associated with the respective BUTTON command (including associated strings and nested BUTTON command codes) are copied from the button command buffer 82 into the one of button reserve function string records 80 corresponding to the one of mouse function records 30 the function of which is to be changed (step 1206). Button reserve function string records 80 are used in conjunction with a RESTORE command to restore the function of one of mouse buttons 26a-26d to its original function, as previously described.

The string associated with the BUTTON command (corresponding to the parenthetical argument of the BUTTON command as it appears in the source code profile data file) is then stored into the function string field 30b of the respective mouse function record 30 corresponding to the mouse button to be changed (step 1208). It is then determined whether the button command buffer 82 is empty (since the function of more than one of the mouse buttons 26a-26d may be changed by a single task definition statement or actuation of mouse 26) (step 1210). If the end of the button command buffer 82 has not been reached, then step 1202 processes the next BUTTON command contained therein.

While the various connections between the elements are shown in the drawings as a single line, they are not so shown in an limiting sense and may comprise plural conductors/connections as is understood in the art. Moreover, the above description is of preferred exemplary embodiment of the present invention and the invention is not limited to the specific form shown. Although only a few embodiments of this invention have been described in detail, those skilled in the art will readily appreciate that there are many ways to modify the disclosed system without materially changing the novel advantages, functions or results. Accordingly, all such modifications are intended to be included within the scope of this invention.

What is claimed is:

1. A method for providing visual mediation between a computer operating system and a user, said operating system being associated with a computer of the type including a processor, a memory, a display and means for displaying a cursor at a selected disposition on said display, said method comprising the steps of:
   selectively forming, on said display, indicia of at least one overlay window containing, at predetermined dispositions therein, display indicia of at least one user determinable task assocaited with said overlay window, said task corresponding to an operation by said computer, said selectively forming step comprising the steps of:
      developing, for each overlay window, window definition datum corresponding to said overlay window, said window deifinition datum including, with respect to each assocaited task, task designation datum designating at least one task, and a task definition code string representing a predetermined operation by said computer;
      determining the number of task associated with said overlay window;
      determining, from said determined number of assocaited tasks, an appropriate geometry for said overlay window and relative dispositions of said display indicia of said tasks in said overlay window;
      developing, from said window definition datum, a window definition block corresponding to said overlay window, said window definition block including at least one task definition record corresponding to each associated task, said task definition record including indicia of said task designation datum, indicia of the realtive disposition of the task display indicia in said overlay window, and indicia of said task definition code string; and
      storing said window definition block in said memory;

sensing correspondence of the relative disposition of said cursor on said display and the relative dispositions of said task display indicia; and
   selectively effecting a predetermined operation by said computer in accordance with the task definition of the task having display indicia at a disposition on said display corresponding to the disposition on said display of said cursor.

2. The method of claim 1 wherein at least a portion of said task definition code string represents key strokes said operating system associates with a predetermined operation.

3. The method of claim 1 wherein at least a portion of said task definition code string represents a further user-determinable task.

4. An apparatus for facilitating operation by a user of a computer system, said apparatus comprising:
   data entry means for providing information defining at least one set of user variable task definitions;
   conversion means, receiving said task definitions defined by said data entry means, for generating for each task definition in said set, task display indicia and respective task definition indicia, said task definition indicia representing command signals specifying a predetermined operation of said computer system;
   storage means, connected to receive said indicia generated by said conversion means, for storing said task display indicia and said task definition indicia;
   display means, operatively coupled to said storage means, for selectively displaying the stored task display indicia associated with said set and for displaying a movable indicator;
   an input device, manipulable by the user, including means operatively coupled to said display means for controlling the relative position of said displayed movable indicator on said display means, said input device selectively producing a first interactive control signal; and
   processing means, responsive to said first interactive control signal and to said command signals, for effecting operation of said computer system, said processing means for;
   designating at least one of said task definitions in response to positional correspondence on said play between a display task display indicia and said displayed movable indicatior;
   generating the command signals represented by the task definition indicia associated with said designated task definition in response to said first control signal, and
   effecting the operation of said computer system specified by said generated command signals.

5. An apparatus as in claim 4 wherein:
   said processing means determining indicia specifying the relative positions of said task display indicia on said display means; and
   said storage means includes means for storing said relative position indicia.

6. An apparatus as in claim 5 wherein:
   said processing means forms an overlay window to be displayed; and
   said display means displays said formed overlay window and the respective stored task display indicia associated with said set within said displayed overlay window at positions specified by said relative position indicia.

7. An apparatus as in claim 6 wherein said processing means determines the instantaneous number of task definitions in said set, and determines, in accordance with said instantaneous number of tasks in said set, said relative position inidica and an appropriate geometry and format for said formed overlay window.

8. An apparatus as in claim 4 wherein said display means selectively displays the task display indicia in response to said first control signal.

9. An apparatus as in claim 4 wherein:
said input device also selectively produces a second control signal; and
said processor means conditions at least some of said proedetermined operations of said computer system on the production of said second control signal by said input device.

10. An apparatus as in claim 9 wherein said input device comprises a mouse pointing device having first and second buttons, said first and second control signals being produced in response to depression by a user of said first and second buttons.

11. A method as in claim 1 further including the preliminary step of defining and/or modifying said user determinable task, associated task designation datum and associated task definition code string in response to input of information to said computer by a user.

12. An apparatus as in claim 4 wherein said processing means also generates and/or changes said user variable task definitions in response to information provided by said data entry means, and supplies said generated task definitions to said conversion means.

* * * * *